(12) United States Patent
Buxbaum

(10) Patent No.: US 6,461,408 B2
(45) Date of Patent: Oct. 8, 2002

(54) HYDROGEN GENERATOR

(76) Inventor: Robert E. Buxbaum, 25451 Gardner Pl., Oak Park, MI (US) 48237

(*) Notice: Subject to any disclaimer, the term of this patent is extended or adjusted under 35 U.S.C. 154(b) by 15 days.

(21) Appl. No.: 09/730,180

(22) Filed: Dec. 5, 2000

(65) Prior Publication Data

US 2001/0000380 A1 Apr. 26, 2001

Related U.S. Application Data

(63) Continuation-in-part of application No. 08/936,665, filed on Sep. 24, 1997, now Pat. No. 5,888,273, and a continuation-in-part of application No. 08/875,046, filed as application No. PCT/US96/18131 on Nov. 6, 1996, now Pat. No. 5,931,987.

(60) Provisional application No. 60/016,597, filed on May 8, 1996, provisional application No. 60/007,298, filed on Nov. 6, 1995, provisional application No. 60/007,297, filed on Nov. 6, 1995, and provisional application No. 60/026,918, filed on Sep. 25, 1996.

(51) Int. Cl.$^7$ .............................................. B01D 53/22
(52) U.S. Cl. ..................... 95/55; 95/53; 95/56; 96/8; 96/10; 96/11; 55/524
(58) Field of Search ................................ 95/45, 55, 56; 96/4, 7–11

(56) References Cited

U.S. PATENT DOCUMENTS

| | | | | |
|---|---|---|---|---|
| 1,881,490 A | * | 10/1932 | Gmelin et al. ................ | 96/4 X |
| 2,609,059 A | | 9/1952 | Benedict ........................ | 95/55 |
| 2,958,391 A | | 11/1960 | deRosset .................... | 96/11 X |
| 3,210,162 A | | 10/1965 | Rudd .......................... | 96/7 X |
| 3,241,293 A | | 3/1966 | Pfefferle ........................ | 95/56 |
| 3,241,298 A | | 3/1966 | Pierce ........................ | 96/11 X |
| 3,338,681 A | | 8/1967 | Kordesch ..................... | 96/8 X |
| 3,344,582 A | | 10/1967 | Merrill et al. .................. | 95/56 |
| 3,350,176 A | | 10/1967 | Green et al. ................. | 96/10 X |
| 3,350,846 A | | 11/1967 | Makrides et al. .............. | 95/56 |

(List continued on next page.)

FOREIGN PATENT DOCUMENTS

| | | | | |
|---|---|---|---|---|
| GB | 1292025 | * | 10/1972 | |
| JP | 45-014404 | | 5/1970 | ..................... 95/56 |
| JP | 45-002642 | | 9/1970 | ..................... 95/56 |
| JP | 01-145302 | | 6/1989 | ..................... 95/56 |
| JP | 01-145303 | | 6/1989 | ..................... 95/56 |
| JP | 06-134244 | | 5/1994 | ....................... 96/8 |
| SU | 0573444 | | 10/1977 | ....................... 96/8 |

OTHER PUBLICATIONS

Booth, J.C.S., Doyle, M.L. Gee, S.M., Miller, J., Scholtz, L–A., and Walker, P.A. "Advanced Hydrogen Separation Via Thin Supported Pd Membranes" Hydrogen Energy Progress XI, vol. 1, pp. 867–878 (no date).

Buxbaum, Robert E. and Kinney, Andrew B. "Hydrogen Transport Through Tubular Membranes of Palladium–Coated Tantalum and Niobium" Industrial & Engineering Chemistry Research, vol. 35, No. 2, pp. 530–537 (1996).

*Primary Examiner*—Robert H. Spitzer
(74) *Attorney, Agent, or Firm*—Gifford, Krass, Groh, Sprinkle, Anderson & Citkowski, P.C.

(57) ABSTRACT

An apparatus for extracting a gas, in particular hydrogen, from a fluid stream utilizing a plate membrane flattened with a wave spring on the low pressure side of the membrane and a turbulence generator on the high pressure side. Alternately, the membrane is folded and wrapped against a central conduit within the membrane fold. Extraction membranes have a substrate layer of Ta—W, V—Co, V—Pd, V—Au, V—Cu, V—Al, Nb—Ag, Nb—Au, Nb—Pt, Nb—Pd, V—Ni—Co, V—Ni—Pd, V—Nb—Pt or V—Pd—Au alloy or combination thereof and a first layer affixed to the outer surface of the substrate towards a mixed gas flow which is composed of palladium, platinum, rhodium, or palladium alloys.

33 Claims, 11 Drawing Sheets

U.S. PATENT DOCUMENTS

| | | | |
|---|---|---|---|
| 3,368,329 A | 2/1968 | Eguchi et al. .................... | 96/8 |
| 3,410,058 A | 11/1968 | Oswin ............................. | 96/7 |
| 3,665,680 A | 5/1972 | Heuser .......................... | 96/10 |
| 3,761,382 A | 9/1973 | Hammond et al. ......... | 96/10 X |
| 3,782,904 A | 1/1974 | Fletcher ...................... | 96/10 X |
| 3,972,695 A | 8/1976 | Buckley et al. ................ | 96/10 |
| 4,003,725 A | 1/1977 | Bunn, Jr. et al. ................ | 96/8 |
| 4,313,013 A | 1/1982 | Harris ........................ | 95/56 X |
| 4,427,424 A | 1/1984 | Charpin et al. .................. | 96/8 |
| 4,468,235 A | 8/1984 | Hill ............................ | 95/56 X |
| 4,472,176 A | 9/1984 | Rubin ........................... | 95/56 |
| 4,496,373 A | 1/1985 | Behr et al. .................. | 95/56 X |
| 4,536,196 A | 8/1985 | Harris ....................... | 95/56 X |
| 4,781,241 A | 11/1988 | Missage et al. ................. | 165/1 |
| 4,810,485 A | 3/1989 | Marianowski et al. ...... | 95/56 X |
| 4,849,187 A | 7/1989 | Uozu et al. ................. | 422/197 |
| 4,849,189 A | 7/1989 | Jansz .......................... | 423/64 |
| 4,901,790 A | 2/1990 | Meijer ........................... | 96/10 |
| 4,904,455 A | 2/1990 | Karafian ....................... | 422/210 |
| 4,981,676 A | 1/1991 | Minet et al. ................ | 95/55 X |
| 4,986,837 A | 1/1991 | Shibata ........................ | 96/8 X |
| 5,181,941 A | 1/1993 | Najjar et al. ................ | 95/56 X |
| 5,205,841 A | 4/1993 | Vaiman ...................... | 95/56 X |
| 5,215,729 A | 6/1993 | Buxbaum ................... | 95/56 X |
| 5,226,928 A | 7/1993 | Makabe et al. ................ | 48/94 |
| 5,229,347 A * | 7/1993 | Prada et al. ................. | 502/221 |
| 5,358,553 A | 10/1994 | Najjar et al. ................ | 95/56 X |
| 5,382,271 A | 1/1995 | Ng et al. ....................... | 48/61 |
| 5,449,848 A | 9/1995 | Itoh .......................... | 95/56 X |
| 5,458,857 A | 10/1995 | Collins et al. .............. | 422/198 |
| 5,498,278 A | 3/1996 | Edlund ....................... | 95/56 X |
| 5,510,559 A | 4/1996 | Barger et al. ............... | 585/664 |
| 5,516,344 A | 5/1996 | Corrigan .................... | 48/127.9 |
| 5,518,530 A | 5/1996 | Sakai et al. .................. | 95/56 X |
| 5,534,471 A * | 7/1996 | Carolan et al. .............. | 96/4 X |
| 5,639,431 A | 6/1997 | Shirasaki et al. ............ | 422/212 |
| 5,681,467 A * | 10/1997 | Solie et al. ................. | 210/486 |
| 5,888,273 A * | 3/1999 | Buxbaum ....................... | 95/56 |
| 5,931,987 A * | 8/1999 | Buxbaum ....................... | 95/55 |
| 5,997,594 A * | 12/1999 | Edlund et al. ................. | 96/7 X |
| 6,024,774 A * | 2/2000 | Nakagawa et al. ......... | 95/45 X |
| 6,245,304 B1 * | 6/2001 | Jansen et al. ................ | 96/8 X |
| 6,245,309 B1 * | 6/2001 | Etievant et al. .............. | 96/7 X |
| 6,319,306 B1 * | 11/2001 | Edlund et al. ................... | 96/7 |

* cited by examiner

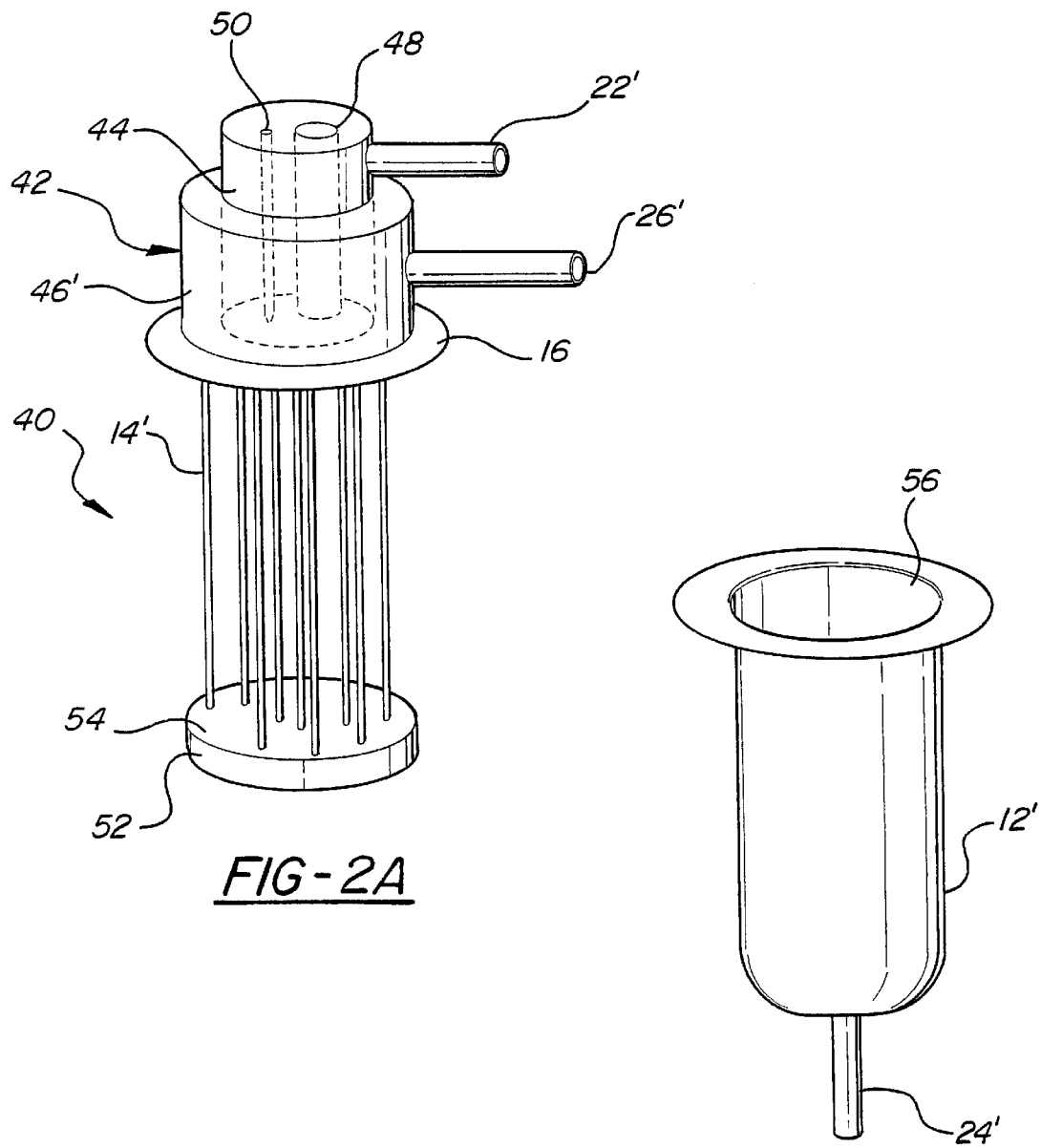
FIG-2A
FIG-2B
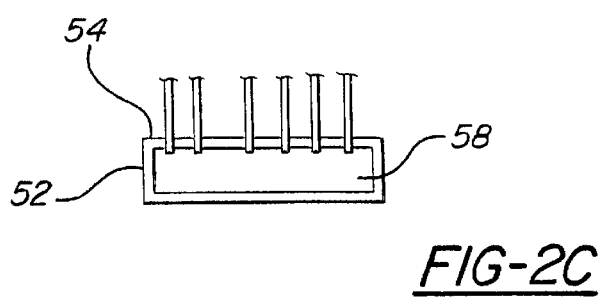
FIG-2C

HYDROGEN GENERATOR

RELATED APPLICATIONS

This application is a continuation-in-part of U.S. patent application Ser. No. 08/875,046 filed Sep. 11, 1997, now U.S. Pat. No. 5,931,987, which is the U.S. National Phase of PCT/US96/18131 filed Nov. 6, 1996, designating the U.S. and claiming benefit of U.S. provisional applications Serial No. 60/016,597 filed May 5, 1996, Nos. 60/007,298 and 60/007,297 both filed Nov. 6, 1995, and U.S. patent application Ser. No. 08/936,665 filed Sep. 24, 1997, now U.S. Pat. No. 5,888,273, which claims the priority of U.S. provisional patent application Serial No. 60/026,918 filed Sep. 25, 1996, all of which are incorporated herein by reference.

TECHNICAL FIELD

The present invention relates to an apparatus for the purification of a constituent gas and also to the generation of a constituent gas and the subsequent separation and purification from a mixed gas flow. More specifically, the present invention relates to the generation or purification of hydrogen from a mixture containing hydrogen. The apparatus utilizes one or more gas extraction membrane for removing hydrogen or other extractable gas from a mixed gas flow.

BACKGROUND OF THE INVENTION

A common technology for hydrogen generation involves the following processes in series: high temperature steam reforming at pressures between 150 and 300 psi, a high temperature water-gas shift reactor, a low temperature water-gas shift reactor, and a hydrogen purifier. The purifier is most typically a PSA (pressure swing absorption) system, but can also be a membrane or partial oxidation process. The water-gas shift reactors are employed to generate additional hydrogen from carbon monoxide produced in the high temperature reformer via the following (water-gas shift) reaction:

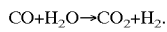

$$CO + H_2O \rightarrow CO_2 + H_2.$$

Cooling is required because the water-gas shift reaction is exothermic and equilibrium limited. Thus, lowering the gas temperature promotes the reaction. There is a limit to the effectiveness of lower temperatures, since the reaction rate generally decreases with decreasing temperature. The high temperature shift reactor is thus designed to operate at an intermediate temperature, lower than that of the reformer but higher than that of the low temperature shift reactor that follows. The high temperature shift reactor generates hydrogen at relatively high catalyst turnover, but gas temperature in this reactor limits the amount of hydrogen that can be produced. Inter-cooling between the two shift reactors reduces this temperature so that additional hydrogen can be produced, albeit at a lower catalyst turnover. A single stage adiabatic reactor (membrane or otherwise) could be used with a sufficiently low feed temperature, but the catalyst effectiveness would suffer because of the low temperature at the entrance. Further, heat generated by the water-gas reaction would raise the temperature in the reactor, limiting the effectiveness of this approach.

A common technology for extracting pure hydrogen from industrial streams, such as for hydrogenation for changing the balance of hydrogen in those streams or to increase reaction selectivity, is to use membranes of palladium or palladium alloys alone or supported structurally by a matrix. Membranes which contain thick enough palladium layers to be made without holes and not break during service tend to be expensive and have relatively high resistance to hydrogen permeation. The membranes are disposed in a housing. A mixed gas flow is conducted to the housing wherein the extraction occurs. Extracted gas (such as hydrogen) is preferentially extracted through the membranes and exits through an outlet port. A second outlet allows for the exhaust of raffinate out of the chamber. Examples of such chambers are shown in U.S. Pat. Nos. 5,205,841 and 4,468,235.

Several membrane variations and module designs have been proposed to minimize this effect. Membranes can include porous ceramics either by themselves or coated with palladium alloys or with silica and palladium coated refractory metals and alloys, especially those based on Nb, V, Ta, Ti, Zr. These have greater strength than palladium and palladium-based alloys, are cheaper per unit volume, and most have greater intrinsic permeabilities to hydrogen. Although the alternatives are less expensive than Pd, they are not less expensive compared to polymers. Thus, with all of these membranes more attention must be directed to module designs that make efficient use of the membrane surface and provide a high recovery percentage without undue gas-phase mass transfer resistance. To date, no commercial module has been described that is particularly efficient for large scale hydrogen extraction using any of these membranes.

An example of an apparatus for hydrogen separation is disclosed in U.S. Pat. No. 4,468,235 to Hill (Hill '235). The Hill apparatus for separating hydrogen from fluids and includes, mounted axially in a cylindrical pressure vessel, a plurality of membranes in the form of tubes coated on either the inside or the outside or both sides with coatings having a high permeability to hydrogen. There is also a fluid flow inlet and a raffinate flow outlet and a header to collect hydrogen. No sizes or criticalities are disclosed for the extraction membrane. Additionally, since this design provides no mechanism for flow distribution or turbulence generation, the separation efficiency of this apparatus is not maximized.

Another example of a similar apparatus for hydrogen extraction is disclosed in U.S. Pat. No. 5,205,841 to Vaiman (Vaiman '841) issued Apr. 27, 1993. The Vaiman '841 patent discloses an apparatus for separating hydrogen from gas and gas liquid mixtures at low temperature. The Vaiman '841 apparatus includes a plurality of axially mounted tubes coated on both their inside and outside surfaces with palladium/platinum black. There is also a fluid flow inlet and a raffinate flow outlet and a header to collect hydrogen. Vaiman '841 does not teach any sizes or criticalities for the extraction membrane or its arrangement within the structure. Additionally, as similarly stated above regarding the Hill patent, the Vaiman '841 design provides no mechanism for flow distribution or turbulence generation. Separation efficiency of this apparatus is not maximized.

Another typical design for large hydrogen extractors uses tubular membranes of palladium-silver alloy in spiral form. This tubing generally has an outer diameter of 0.0625 to 0.125 inches and wall thickness of approximately 0.003 inches. For the smaller diameter tubes, the source hydrogen flows over the outside of several wound helixes made from 10 to 15 feet of tubing. These hydrogen extractors typically require complex expensive construction that limits heat and mass transport. Also, since pressure drops become excessive when the tube length exceeds about 25 feet, large modules end up with 40 or more nested and stacked helixes that must be hand assembled in a large tubular bundle without damaging any single one of the delicate tubes. This is a delicate construction process by any standard.

Large diameter tubes avoid maldistribution and assembly problems by driving all of the flow through a single tube. The practical limit is reached at about 100 feet. Longer lengths lead to destructive harmonic vibrations, especially during start-up and shut-down. Also, since module size increases with the square of the tube diameter, such units have had to be too big to site comfortably. Further, temperature uniformity is even harder to maintain than with $\frac{1}{16}$ inch units.

The spiral type designs are particularly difficult to form when dealing with coated refractory metals or with ceramics, as these materials are more brittle than palladium and coated membranes require more gentle handling than homogenous palladium alloys. The spiral type designs inherently have problems with scraping of the membrane surfaces and with kinking of the tubing material during manufacture thereby leading to inherent weaknesses in the tubes which are utilized under pressure. For large scale applications, these spiral-type hydrogen extractors tend to be larger in overall size than the module of the present invention thereby adding to the cost of the structure, sitting, shipping, maintenance, manufacture, and making them unpleasant to the eye.

To date, modules based on tubular ceramics or ceramic-based membranes known are based on a single pair of concentric tubes. The diameter of the ceramic membranes is approximately 0.375 inches. Such designs cannot be readily scaled up for commercial applications.

The present invention provides a hydrogen extraction module which eliminates the spiral-type extraction membranes and is much more simple to construct, more compact, and can be more easily constructed from difficult materials, such as ceramics, and from high diameter to wall ratio metal tubes.

The present invention also provides improved hydrogen recovery from relatively impure mixtures through the use of critically sized extraction membranes and turbulence generating bumps or packing.

Another approach to the problems of palladium based membranes recognizes that the specific alloys are chosen by a trade-off between cycling stability, ease of drawing, high permeance, lower volumetric cost, and relatively good surface properties. Currently, the single material that most closely meets all of these criteria is made from palladium-silver alloys containing 23 to 25% silver. These tubes typically trade off exposure for moderate cycling stability. They typically do not break for about two years in operation and have moderate drawability against their relatively high expense and high resistance to hydrogen permeation, especially at temperatures below 300° C. and for gas streams containing sulfur, carbon monoxide, and olefins.

Several options to palladium-silver membranes have been suggested, but are not in common use. For example, the British Patent No. 1,292,025 to Darling discloses a membrane requiring porous or discontinuous palladium coat over a base of refractory metal Nb, V, or Ta. The U.S. Pat. No. 4,496,373 to Bohr et al. discloses alloying the palladium layer with silver, calcium or yttrium. The patent also requires an intermediate melt layer. The U.S. Pat. No. 4,536,196 to Harris discloses essentially a palladium membrane which is coated with various metals as poisons to prevent the fouling of the palladium surface. Under some circumstances, this poisoning can be advantageous to the surface properties of the membrane, but the high cost and low reliability of palladium remains. The U.S. Pat. No. 4,313,013 to Harris shows similar palladium membranes that have been in use.

The U.S. Pat. No. 3,350,846 to Makrides et al. discloses a process of purification of hydrogen by diffusion through a very thin membrane of palladium coated Group V—B metal.

The U.S. Pat. No. 5,215,729 ('729) issued Jun. 1, 1993 to the inventor of the present application and incorporated herein by reference teaches membranes which combine the strength and high permeation of refractory metals with a coating of palladium or palladium alloys to improve the surface properties of the membranes. As with single-layer palladium alloys, selectivity is essentially 100% for hydrogen extracted. Applicant has observed that some of the best refractory metals can be difficult to fabricate into tubes or modules. Applicant has further observed that the surface properties of some of these membranes were often far better than those of single layer palladium-silver, especially at low temperatures and in the presence of carbon monoxide, hydrogen sulfide, and olefins.

In view of the above, a further object of the present invention is to improve on the properties of palladium-silver and similar alloys by adding a coating of palladium or similar materials to improve the surface properties. The resulting membranes have good strength, ease of fabrication, good durability, relatively low resistance to hydrogen even at low temperatures, improved resistance to carbon monoxide, $H_2S$ and olefins, fair resistance to embrittlement, and a hydrogen selectivity that can exceed that for palladium-silver because the operating temperature can be lower.

SUMMARY OF THE INVENTION

A membrane reactor is detailed herein including a chamber, an inlet for introducing a mixed gas stream into the chamber, and a gas separator membrane having a surface in fluid communication with the mixed gas stream. The opposing surface of the gas separation membrane is in contact with a constituent gas of the mixed gas stream that has passed through the membrane that is disposed within the dimensions of the chamber. A catalyst is disposed within the chamber that facilitates an exothermic chemical reaction of the mixed gas stream. The membrane reactor is equipped with a first outlet in fluid communication with the opposing surface of the membrane for removing the constituent gas that has passed through the membrane and a second outlet for removing a waste gas stream from the chamber that has been depleted in the constituent gas. The membrane reactor is further equipped with a flowing coolant in thermal contact with the chamber for withdrawing thermal energy from the chamber.

A process for separating a gas component from a mixed gas stream includes reacting the mixed gas stream exothermically with a catalyst in the presence of a membrane selected for passing the gas component and flowing a coolant in thermal communication with the mixed gas stream. A method of operating a water-gas shift membrane reactor according to the present invention includes flowing a coolant in thermal communication with the reactor to withdraw heat generated by the water-gas shift reaction.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 2A, 2B and 2C are exploded perspective views of two "pressure-inside" embodiments of the present invention;

DETAILED DESCRIPTION OF THE INVENTION

Figure 1A:
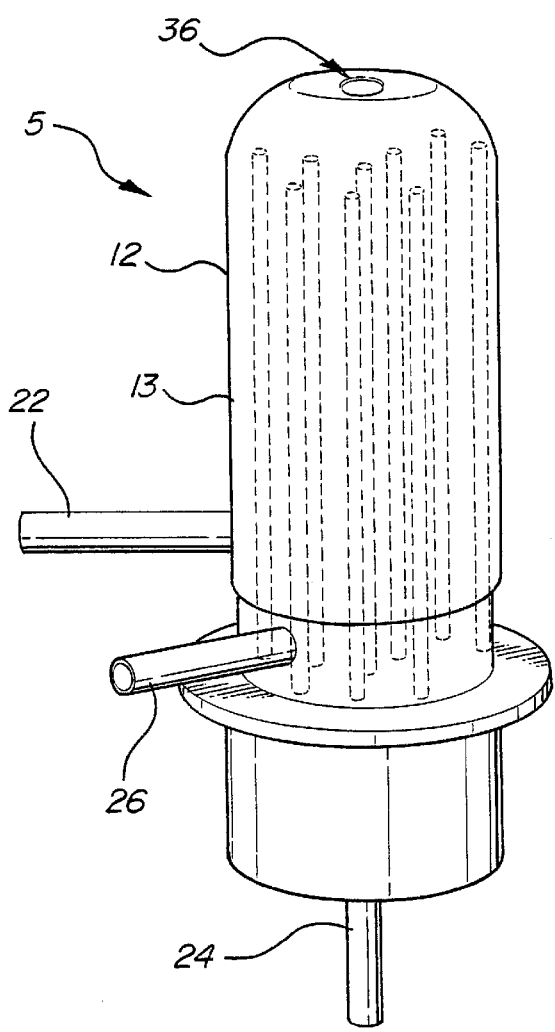
FIGS. 1A and 1B are exploded perspective views of a "pressure-outside" embodiment of the present invention.

An apparatus for extracting hydrogen from fluid streams containing hydrogen is generally shown at 5 in FIG. 1A. The Figure schematically shows a membrane system for removing hydrogen from a fluid. Mounted in a pressure vessel 12 is a plurality of membranes in the form of tubes 14. The tubes 14 are operatively connected at one end to a header 16 and the other end of the tubes 14 are either capped or can be operatively attached to a floating head 52 as shown in FIG. 2A and discussed in greater detail below. Attachment of the tubes 14 to the header 16 and the header 16 to the pressure vessel 12 can be accomplished by welding, soldering, brazing, by using a high temperature inorganic glue or by methods well known by those skilled in the art.

Figure 1B:
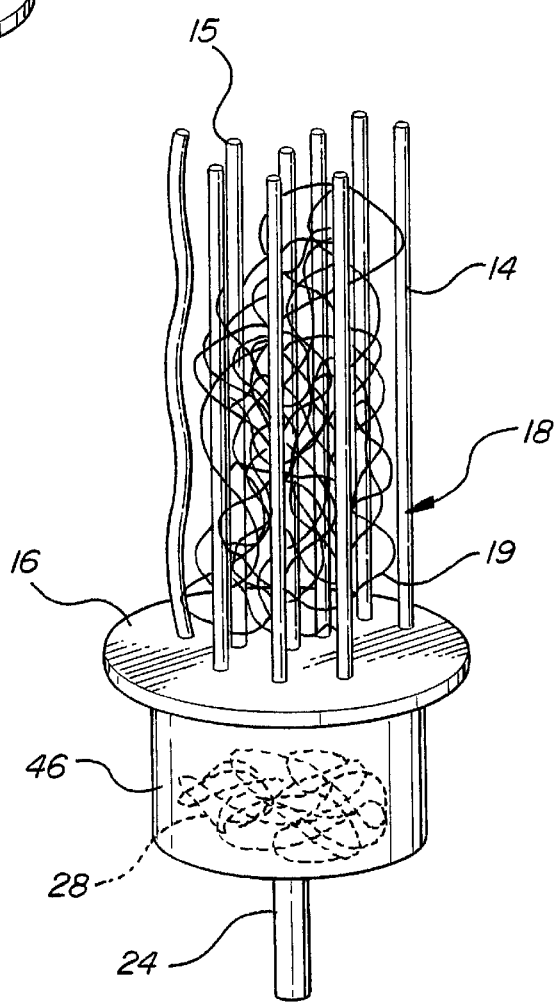

FIGS. 1A and 1B illustrate an embodiment of the present invention referred to as a "pressure-outside" design. In this embodiment, the inlet flow of fluid containing a mixed gas includes hydrogen flowing outside of and over the outer surface of the tubes 14. A tube cap is indicated at 15. The pressure vessel 12 includes an inlet 22 which defines a passageway for the introduction of the fluid stream containing hydrogen into the vessel 12. The pressure vessel 12 further includes a passageway disposed in fluid communication with an outlet 26. An additional outlet 24 is disposed in fluid communication with the header 16 to allow for the exit of pure extracted hydrogen from the apparatus 5. The outlet 26, disposed in fluid communication with the pressure vessel 12, is provided to allow the exit of raffmate or to allow the fluid having had some of the hydrogen removed to exit the pressure vessel 12.

The fluid enters the inlet 22 under a positive pressure. The pressure head can range from about 0 to 600 psi. The pressure head is preferably between 80 and 250 psi. Such a pressure head would normally tend to induce collapses of the planar membranes unless certain structural conditions are met as discussed below. It should be noted that these ranges are not meant to be limiting as the pressure head is dependent upon the membrane of choice.

The tubes 14 which comprise the hydrogen extraction membrane can include at least one straight or substantially straight axially aligned tube having an outer diameter ranging, for a metal substrate membrane, from approximately 0.007 inches to 0.100 inches and having a permeation barrier thickness ranging from approximately 0.0002 inches to approximately 0.002 inches. A ceramic or polymeric substrate membrane can include tubes having an outer diameter ranging from approximately 0.010 inches to 0.300 inches and having a permeation barrier thickness ranging from approximately 0.000002 inches to 0.001 inches. These ranges of outer diameters and permeation barrier thicknesses provide an optimal balance of strength, flux, and low cost of construction.

Most preferably, for metal membranes, the ratio of the wall thickness to tube diameter is approximately 1:40. For most metal substrates, this provides a membrane which is thick enough to withstand 250 psi and 350° C. without tube collapse, but is not significantly thicker. The membrane thus maximizes permeation efficiency under a broad range of temperatures and pressures popularly utilized by those skilled in the art.

Generally, in a non-porous metallic membrane, the permeation barrier thickness will equal the wall thickness, and in a porous or porous supported membrane, the permeation barrier will be much smaller than the wall thickness.

With non-porous, metallic membranes, using smaller diameter tubes 14 for the hydrogen extraction module 5 of the present invention allows more surface area of membrane to be packed into a given module volume and allows the use of thinner wall tubes for both "pressure-outside" and "pressure-inside" designs. Further, thinner wall tubes involve less material cost than thick walled tubes and generally have higher flux as well.

The transport resistance in the tube wall generally increases in proportion to the wall thickness increases. Similarly, except for the design modifications specified in the present application, transport resistance in the stagnant gas layer next to the wall tends to increase in rough proportion to the tube diameter. This is particularly apparent in a pressure inside design such as that shown in FIG. 2A where the tubes are long and the gas flow is laminar. For such designs, the mass transport resistance is approximately that of a region of stagnant gas one-third as thick as the tube diameter. The amount of this resistance then decreases in direct proportion to the tube diameter.

The same advantages of small diameters also apply to pressure outside designs where the flow is turbulent and crosswise, or laminar flowing axially in the small space between the tubes. As set forth above, without the current invention, a turbulence inducing means, the stagnant gas layer thickness again decreases as the tube diameter decreases. Hence, the flux increases with decreasing tube diameters.

Turbulence producers, pellets, packing, bends, and catheters as shown in FIG. 1B can minimize the size of this stagnant layer. Use of baffles, protrusions, packing and the like with pressure-outside straight tube modules increase gas-phase mass transfer and improve separation efficiency. This is especially effective when the gas source contains a significant amount of non-permeable, such as carbon monoxide, methane, carbon dioxide, or water.

The only major disadvantage of the small diameter design is that axial pressure drops can become unacceptably high for any reasonable length of tube. This is the reason for specifying a minimum tube diameter for the tubes 14 of the present invention, and for distributing the axial flow among a plurality of tubes 14 or channels thereby allowing shorter tubes and thereby limiting the amount of fluid flow per tube or channel.

For ceramic-based tubes the optional diameters can be as large as 3 inches or even larger if packing or catheters, such as shown in FIG. 2B, or a well-chosen flow channel is used. A particularly useful flow channel in this regard is a small annulus, approximately 0.12 to 0.10 inches thick, or an annulus containing bumps, protrusions, catalysts, beads, baffles, or other turbulence generating means. This annulus allows the large membrane to have the same good transport characteristics as described above. Large diameter membranes are feasible with ceramic-based membranes because the substrate costs are low while the permeance tends to be high. The key feature of such a module is that there should be packing or the distance between the membrane and the catheter, or module housing 12 in FIG. 1A should be 0.010 inches to 0.120 inches.

The tubes 14 are arranged axially and are closely spaced within the pressure vessel 12. The small diameter of the tubes 14 coupled with the permeation barrier or wall thickness set forth above provide a tube 14 which is capable of withstanding internal and/or external pressure without collapsing or crushing under the force of the pressure.

The use of large diameter to wall ratio tubes in pressure-outside designs, e.g. FIG. 1, requires one to support the tubes from collapse. This has been done previously with springs, but these springs are typically of only marginal benefit since the springs themselves bunch up when the tubes are put under pressure. One aspect of the present invention is to support those tubes with springs whose pitch angle is 30° or less such that the spring pitch spacing is less than half the inside diameter of the tubes. By specifying the spring pitch this way, one insures that friction between the spring and the interior of the tube prevents the spring from bunching regardless how high the external pressure.

A particular advantage of the present design is that it facilitates the function of a large bundle that is found to have a flaw or hole. As modules are constructed with greater volumetric output, additional membrane is required. This increased use of membrane enhances the probability of a leak being found somewhere in a membrane and the economic loss associated with such a leak. Typically, even one small leaking tube renders a module unable to attain desired purification levels. For this reason existing membranes use thick walled tubes to assure flaw free modules of fairly large size at the expense of additional membrane material. The present invention, with its relatively short tubes, makes it possible to seal off a leaking membrane after the module has been assembled. Thus, for example, the present invention is adapted to allow the removal of the header 46 and perform a high pressure bubble test on the complete module. Thereafter the ends of any tubes that are found to bubble or leak are sealed off. Sealing is illustratively accomplished by welding or by placing a drop of braze over the end of the leaking tubes. The specific sealing method being dictated by the nature of the tubular membrane. Alternatively, a flawed tube is cut from the base and a drop of braze sealed therein. Typically only one or two extra tubes must be added to a large bundle, thereby allowing one to utilize bundles that are found to contain one or two leaking tubes and obtain desired purification volumes. The ability to seal leaking tubes promotes practical construction of large bundles of thin-walled tubes.

The membrane 14 is capable of extracting hydrogen from a fluid stream containing hydrogen. The membrane 14 utilized in the apparatus 5 of the present invention can include any suitable hydrogen extraction membranes known to those skilled in the art. For example, the composite metal membrane disclosed in U.S. Pat. No. 5,215,729, issued Jun. 1, 1993 to the inventor of the present invention and incorporated herein by reference, can be utilized as a membrane in the present invention. However, as stated above, the composite metal membrane disclosed in the '729 patent is provided merely as an example and is in no way intended to be limiting to the types of membranes which can be utilized in accordance with the assembly 5 of the present invention.

For example, the axially disposed tubes 14 can be made of palladium alloys having the composition between Pd-20% Ag and Pd-50% Ag, Pd-40% Cu, Pd-10% Pt or other similar classes of Pd based alloys well known to those skilled in the art. The tubes 14 can also be constructed of a porous metal or ceramic or polymeric material with either a very small pore separation barrier or coated with palladium or silica to increase selectivity. The membranes can also include palladium coated polymeric membranes.

As stated above in the '729 patent, the tubes can also be Pd-coated refractory metal tubes. Additionally, the membrane 14 can include a platinum on palladium black coating to improve both flux and catalytic ability of the membrane 14 by increasing the surface area of the membrane 14. The membrane 14 can further include platinum alloy coatings.

Figure 4:
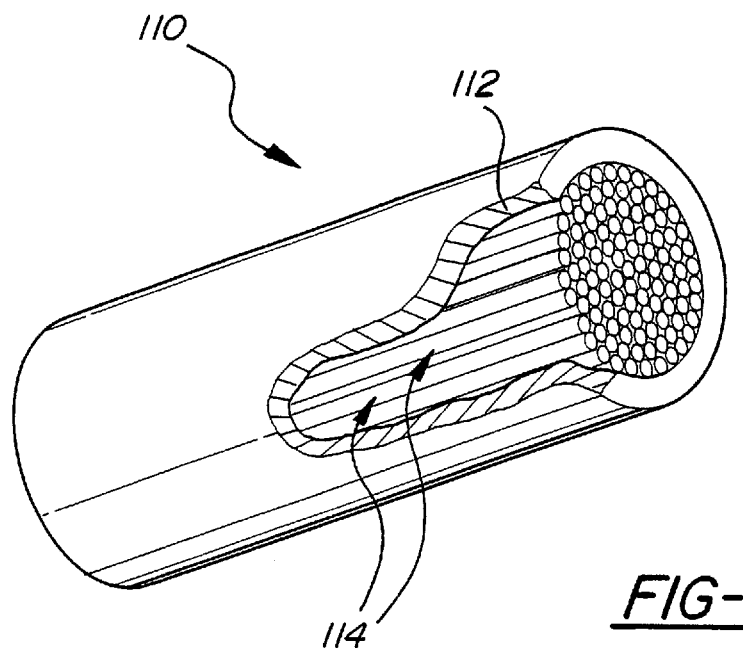
FIG. 4 is a fragmentary cross-sectional view of a tubular membrane bundle constructed in accordance with the present invention.
Figure 5:
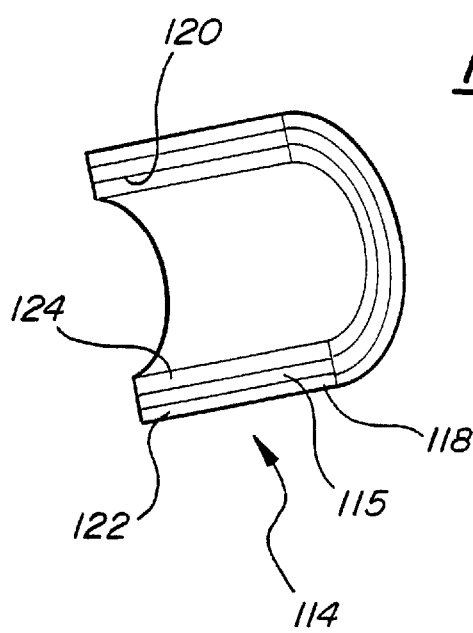
FIG. 5 is a membrane of the present invention.

A module containing an alternative membrane is shown generally at 110 in FIG. 4. The figure schematically shows an outer shell 112 containing a plurality of membranes generally indicated at 114. The membranes 114 are in the form of tubes. A portion of a tube is shown in cross-section in FIG. 5. The tubes are held within the shell attachment to a header sheet. The means of attachment of tubes to header sheet and of header sheet to shell is well known by those versed in the art of palladium-based hydrogen purifiers or of heat exchanger construction (see e.g. U.S. Pat. No. 4,313,013 to Harris).

The membrane 114 is capable of extracting hydrogen from a fluid stream containing hydrogen. The membrane 114 generally includes a first layer 115 of Pd—Ag or Pd—Cu alloy or combination thereof, such as Pd—Cu—Ag, which is permeable to hydrogen, the first layer 115 having a first outer surface 118 and an inner surface 120. The alloys can broadly range from 30 wt. % to 95 wt. % Pd. Typically, the Pd content ranges from 60 wt. % to 77 wt. %.

The Pd alloys of the first layer 115 are chosen for high hydrogen permeability in combination with good strength, low cost, ease of fabrication, low embrittlement, good swelling, and good durability characteristics in the presence of hydrogen and its admixtures. Pd—Ag alloys are desirable because they are relatively available, and are easier to fabricate than refractory metal substrates. They are also resistant to oxidation carbiding, and nitride formation, are fairly resistant to embrittlement and cracking, and are well accepted for use in the electronic gas industry.

A second layer 122 is coated preferably by a wet chemical method (electrolytic or electroless plating) over the first surface 118 and attached to the first layer 115, the second layer consisting essentially of palladium, palladium alloys, or platinum. For example, via a suitable method disclosed in Hsu and Buxbaum (1985), examples of palladium alloys are palladium-silver and palladium-gold. Other examples of metals for alloying with palladium for coating the substrate of the present invention can include ruthenium, indium, platinum, copper and rhodium. These alloys are more capable of dissociating hydrogen gas into molecular hydrogen, protecting the substrate from fouling, and operating in membrane-reactor environments. The molecular hydrogen which forms on this surface then permeates through the first layer 115.

An inner third layer 124 consisting essentially of palladium, palladium alloys, or platinum is coated over the inner surface 120 of the membrane. The palladium and platinum can be either smooth Pd or Pt or can be rough Pd or Pt black. Pd or Pt black are advantageous because they provide more catalytic surface area for a given length and diameter of membrane. This inner layer reassociates the hydrogen or alternatively catalyzes a hydrogen oxidation reaction, e.g. reacting the hydrogen with oxygen gas to form water. In either case this coating thereby promotes permeation through the membrane. That is, the second layer 122 dissociates hydrogen molecules in a fluid mixture into dissociated hydrogen molecules or H-atoms.

The hydrogen easily permeates the thin layer 122 or is drawn to cracks within the layer 122 via surface diffusion. The hydrogen is drawn through the membrane 115 following the path of lower free energy. The permeating hydrogen is associated into $H_2$ molecules or is oxidized (e.g. to water) on the surface of layer 124. The associated molecules then enter the tube and are carried off.

Alternatively, the direction of hydrogen permeation can be run from inside-out, as opposed to outside-in. That is to say, for example, that hydrogen molecules can diffuse through a membrane tube entering at the inside surface and can be removed at the outside surface.

Unlike prior art, noble metal hydrogen permeating membranes, the surfaces of this embodiment of the present invention have not been oxidized or reduced, quenched, or otherwise "treated." Instead there is a new layer of catalytic material deposited directly over the substrate. Another difference is that the substrate is no longer chosen for its hydrogen dissociation/recombination properties and, therefore, can be made from lower cost alloys than those currently employed.

The membrane thickness is chosen based on the expected pressure and temperature of operation and, for tubular membranes, on the diameter of the tube.

Typically, the thickness of the second and third layers 122, 124 are 0.01 to 20 microns, for design of membranes based on most of the alloys above.

The layers 122, 124 perform two functions. First, as stated above, the palladium, or less likely the platinum, are good dissociation catalysts of hydrogen gas or hydrogen rich molecules to atomic hydrogen. The atomic hydrogen then diffuses through the layers 115, 122 and 124. The layers 122, 124 further protect the base metal from poisons such as carbon, oxygen, nitrogen, and sulfur. Thusly, the layers 122, 124 can be said to react with the first layer 115 to make the surface thereof more permeable. Thusly, the present invention provides membranes having a first layer 115 with sufficient strength for the membranes to be made at a desired thinness but further having sufficient hydrogen permeability such that the membranes can be made at a thickness capable of withstanding commercially applied pressures.

The tubes 14 of the present invention can further include periodic crookedness, protrusions 18 or can be interspersed with a packing or mesh 19, or other types of features which can be disposed on either the internal and/or external surfaces of the tube 14, 14' as shown in FIG. 1B. These features intended to cause turbulence or break up the flow of fluid over the membrane tubes 14 to cause greater contact of the source fluid with the extraction membrane 14.

The optional internal passageway 13 allows for preheating the fluid stream and as a means to improve temperature uniformity in the fluid. A thermocouple (not shown) can be disposed in a thermocouple well 36 and used in combination with a heater (not shown) to heat the fluid stream. The hollow space 46 can contain an additional sorber material 28 to increase the purity of the already purified gas by extracting remaining impurities before the gas exits at 24. This packing also provides some protection from membrane fouling during system upsets. Membrane poisons can be carried into the module by gases that back flow through the membrane. A classic case of this is arsine poisoning of palladium silver membranes during back flow incidents during the manufacture of semiconductors. Typical sorbent materials for ultra purification of hydrogen can include niobium, vanadium, zirconium, or titanium in the form of wire, pellets or rough-mesh granules.

Referring to FIGS. 2A and 2B, two "pressure-inside" embodiments of the present invention are shown. In these embodiments, the features that are the same as in the first embodiment are identified with the same numerals having a prime, and the features which are new are identified as such.

As briefly stated above and referring to FIG. 2A, one end of the tubes 14' can be mounted in a floating head 52 to allow for expansion/contraction of the tubes 14' under the influences of heat, pressure, and hydrogen absorption in a "pressure-inside" embodiment. The ends of the tube 14' are shown attached to a fixed member 54 of the floating head assembly 52 by methods known to those skilled in the art. The floating head 52 moves within a cavity 56 defined by the vessel 12'. In this relationship, as the tubes 14' expand or contract, the floating member 52 moves within the vessel 12' thereby allowing for expansion and/or contraction of the tubes 14'.

The tubes 14' penetrate a top sheet 54 of the floating head 52 and are fixed to the floating head 52 where otherwise the floating head 52 is sealed. Thus, when the impure gas flow reaches ends of the tubes 14', the gas remains pressurized within the empty space, 58, and is returned up other tubes 14' attached to the floating head assembly 52. Thus the gas is not allowed to escape to the exterior, except for that hydrogen which diffuses through the tube walls.

At the end of the tubes 14' opposite the end attached to the floating head 52, the tubes 14' are attached to a divided fixed head 42. This fixed head 42 allows the fluid mixture to enter via the inlet 22' and to be distributed to the tubes 14' via a distribution section 44 (shown here as the center of the fixed head 42). The fixed head 42 also collects the raffinate in a section 46' so that it exits through outlet 26'.

The fixed head assembly 42 can include a cartridge heater 48 used to control the temperature of the assembly 40. The fixed head assembly 42 can further include a thermocouple disposed in a well 50. The use of the floating-head assembly 52 allows for pressure to be maintained on the inside of the tubes 14' rather than on the outside of the tubes as is the case in the embodiment utilizing only capped ends on the tubes 14 as shown in FIG. 1. As with the first embodiment of the apparatus 5, the tubes 14' can be sealed to the top sheet 54 e.g. by braze, glue, solder, or high temperature cement or adhesive.

Figure 3A:
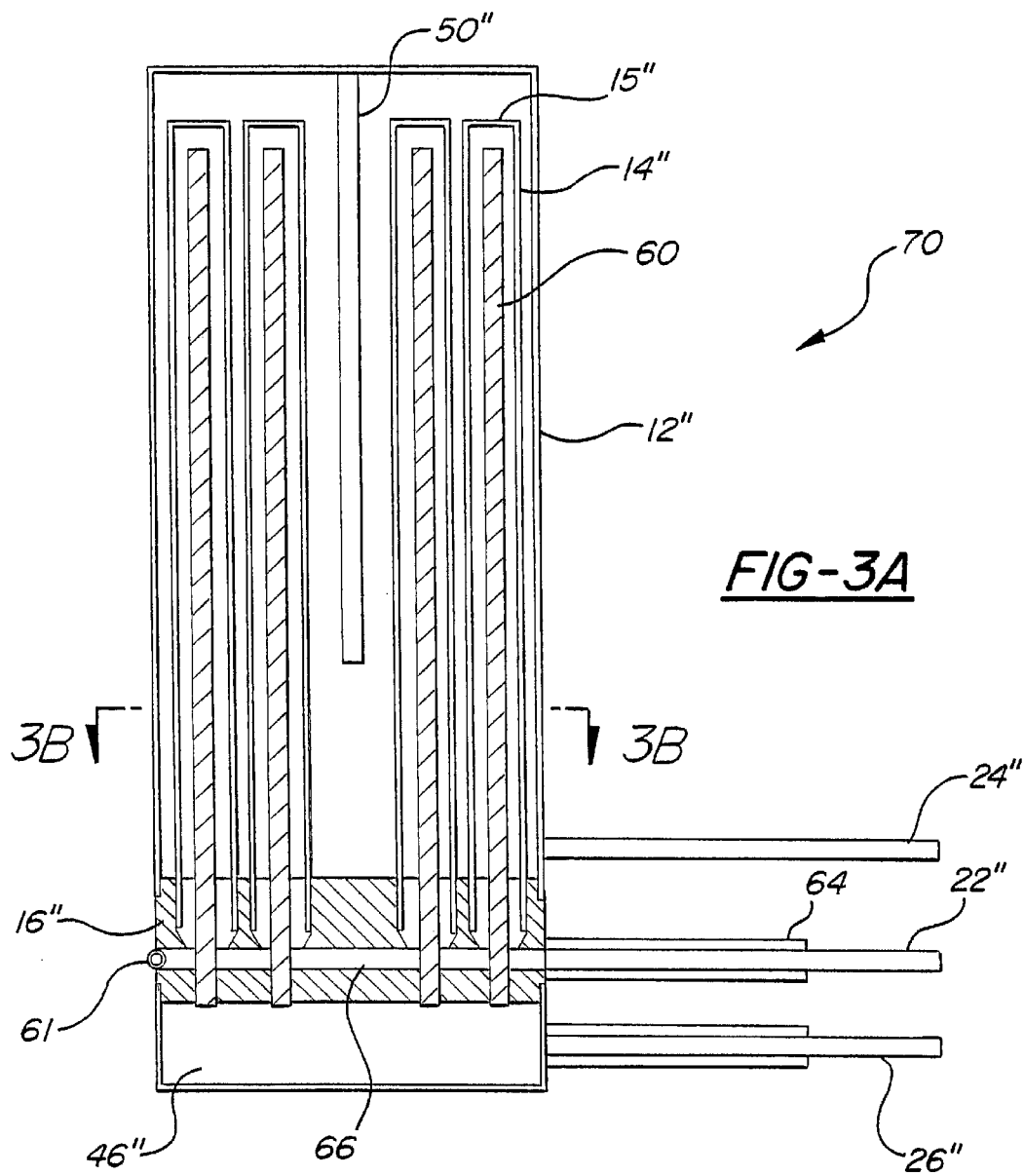
FIGS. 3A and 3B are schematic cross-sectional views of an apparatus including a plurality of membranes constructed in accordance with the present invention.

In an alternative embodiment of the apparatus, shown in FIG. 3A the tubes 14" are independently capped as in FIGS. 1A and 1B. The cap is indicated as 15" but the flow is maintained on the inside of the thimbles by means of interior catheters 60. There is a fixed head 16" but the flow within it is complex as described below. Gas enters from the inlet 22" and flows through an optional heating section 64. The flow is distributed through a series of distribution channels 66 within the fixed head 16". These channels distribute the gas to the inside of the tubes 14". Hydrogen permeates through the tube walls and is collected within the region surrounded by the shell 12". The pure hydrogen exits at outlet 24". The impure gas cannot exit the tubes at the tube tops because of the caps 15". The impure gas returns down the catheter tubes 60 and is collected in a region below the fixed head 46".

The gas collected at 46" contains concentrated impurities as well as some hydrogen and exits at outlet 26". Seals 61 are disposed about the distribution channels 66 to allow easy manufacture, and a thermocouple wall, 50", is shown for temperature regulation. Temperature measured by the thermocouple placed at 50" is used to control the heater 64. There can also be an additional support frame (not shown) within the shell 12" to aid manufacture and keep the tubes from rattling. As with the pressure outside design in FIG. 1A, there can be an additional sorber material (not shown) in the empty space of 46" to sorb out any remaining impurities before the gas exits.

For tubes constructed of materials where expansion and contraction are not serious concerns, the "pressure-inside" design can be fabricated with two fixed heads disposed at opposite ends of the axial tubes. This design is not shown but will be readily comprehended when read in light of the present invention.

Figure 8:
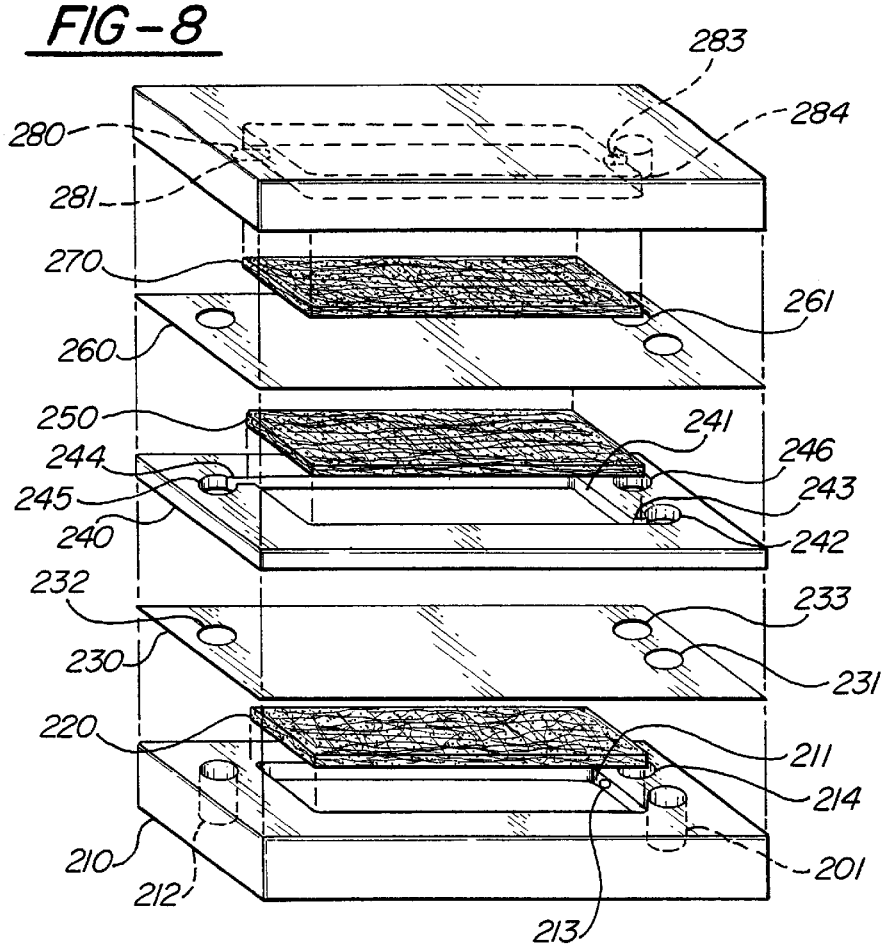
FIG. 8 is a schematic exploded view of a flat-plate embodiment according to the present invention.

FIG. 8 shows a plate separator which is vacuum contact brazed from constituent parts. A first wave spring or ceramic mat 220 is inserted into a slot 211 in a base 210. Preferably the base 210 is constructed of an oxidation resistant fusible high temperature metal alloy illustratively including Monel. A first thin membrane of palladium-copper 230 overlies the wave spring or mat 220. A layer of a Monel type material 240 having a cut out 241 overlies the membrane 230. A ceramic mat 250 which is optionally catalytic towards gaseous reactant species is adapted to fit within the cut out 241. A second palladium-copper membrane 260 and a Monel type material top 280 overlie the mat 250. A second wave spring or mat 270 inserts into a slot 281 in the top 280 and resides between the membrane 260 and the top 280. It is appreciated that neither slot 211 or slot 281 is a through passage.

A mixed gas enters a portal 201 and passes through hole 231, and into hole 242. From there, the gas passes through a channel 243 into cut out portion 241. Gas flowing across the cut out 241 passing over the ceramic mat 250 provides turbulent mixing of the gas and optionally catalytic activation. The hydrogen component of the mixed gas passes through the membranes 230 and 260 and ends up in the two slots 211 and 281. The wave springs or ceramic mats 220 and 280 prevent the membranes 230 and 260 from tearing from the pressure differential that exists across the cut out area 241 and the slots 211 and 280. The gas mixture raffinate exits via channel 244 into hole 245. From there, raffinate passes to hole 232 and 212 and exits the apparatus. The purified gas component flows past the wave springs 220 and 270 into side holes 213 and 283 respectively. Thereafter, purified gas component enters holes 214 or 284. The pure gas flows from 284 through holes 261, 246 and 233, combining with the other stream of pure gas exiting at hole 214. It is appreciated that the two plate gas extraction membrane disclosed herein is amenable to the addition of further membrane layers with the accompanying modifications in gas flow management elements.

The space between the flat plate membrane where the mixed gases flow is defined by the cut out area 241. The length of that cut out must be at least twice as great as the width unless there is a turbulence-generating means within the cut out, such as the spring or mat 250. This ratio reduces the gas-phase mass transport resistance which otherwise decreases mixed gas flux. It also provides advantages in increasing membrane strength. Further, unless there is a support means, such as the spring or mat 220, the ratio between the width of the gap and the thickness is between 10 and 200. Preferably, the gap thickness of at least 0.005" is present to prevent excessive pressure drop, particularly in the channel 243. Because gas-phase mass transfer resistance increases with width and gap thickness, it is preferred to add a turbulence generating means, such as the porous ceramic mat 250 within the cut out 241. In order to increase the overall purification effectiveness, cut out areas optionally are combined either serially or in parallel. When the cut outs are in parallel, it is preferred to add flow-reducing frits therebetween or similar means to insure a balance of flow through the parallel cut outs.

Figure 9:
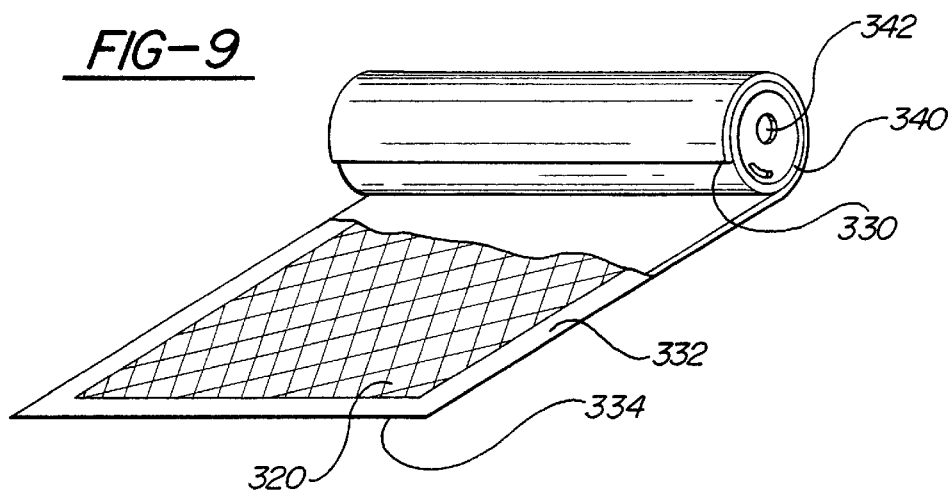
FIG. 9 is a perspective cutaway view of a cartridge apparatus according to the present invention incorporating a flat plate membrane.

FIG. 9 is a schematic view of a cartridge type apparatus according to the present invention incorporating a flat plate membrane. The design of this apparatus follows that of reverse osmosis membranes, for example U.S. Pat. No. 5,681,467. A thin, bendable sheet membrane 330 is creased to form a fold and a spring or ceramic mat spacer 320 is inserted into the interior fold. The interior 332 of the membrane 330 being active towards gas separation. The membrane 330 is then wrapped against a central conduit 340 having a bore 342 in fluid communication with the outside 334 of the folded membrane. Preferably a plurality of folded membranes having spacers within are wrapped against the central conduit. A header (not shown) is connected to the wrapped membranes so as to only be in fluid communication with the interior fold 332 of the membrane 330 and the spacer 320. Thus, a mixed gas flow entering a header (not shown) is depleted on a pure gas component through membrane contact. The pure gas diffusing through the membrane 330 into the conduit 340 leaves a raffinate which is removed by way of an outlet (not shown) which is only in fluid communication with the interior fold 332 of the membrane 330 and the spacer 320. The pure gas within the conduit 340 is removed by way of suitable tubing in fluid communication therewith.

It is appreciated that a cartridge type apparatus of the present invention is optionally operated in reverse with an inlet header conveying mixed gas flow into the conduit 340 and a raffinate outlet. Pure gas being collected from within the fold interior after passing through an inverted membrane having an activated exterior surface for gas separation.

Turbulence generating means operative in the present invention include corrugations, ridges, protrusions, wires, adherent particulate and baffles. Such turbulence generating means disrupt laminar flow of a mixed gas flow over the outer membrane surface so as to promote contact between the mixed gas flow and the purification membrane. Turbulence generating means are mechanically stamped into a plate membrane or alternatively formed by methods as disclosed in U.S. Pat. No. 5,498,278.

Useful alloys of the present invention in this regard are: Ta—W (W=2.5 to 25%), V—Co (Co=1 to 8%), V—Pd (Pd=1 to 10%), V—Au (Au=1 to 10%), V—Cu (Cu=1 to 10%), V—Al (Al=5 to 20%), Nb—Ag (Ag=1 to 10%), Nb—Au (Au=1 to 10%), Nb—Pt (Pt=1 to 10%), Nb—Pd (Pd=1 to 10%) and their combinations, either with each other or with nickel, including V—Ni—Co (Ni=0 to 15%, Co=1 to 8%), V—Ni—Pd (Ni=0 to 15%, Pd=1 to 8%), V—Nb—Pt (Nb=0 to 15%, Pt=1 to 10%) or V—Pd—Au (combination Pd, Au concentration=1 to 20%) wherein the percentages of lesser constituents are weight percent of total weight. Preferably, the less weight percent component is present from 2 to 10%. More preferably, the alloy is one of the following: V-10% Pd, V-5% Ni-5% Co, and V-10% Ni-2% Co.

There are various uses for the hydrogen extraction modules 40 and 70 constructed in accordance with the present invention. For example, the apparatus can be used as a hydrogen extractor for removing hydrogen from refinery gas streams such as cat-cracker off gas, hydrodesulfurization gas or process gas mixes of carbon monoxide, hydrogen, water and carbon dioxide. Alternately it can be used to provide ultrapure hydrogen for analytic (e.g. gas chromatographic) use or electronic manufacture. Alternately this invention can be used to adjust the ratio of hydrogen and carbon monoxide from synthesis gas in methanol or related chemical synthesis.

Figure 10:
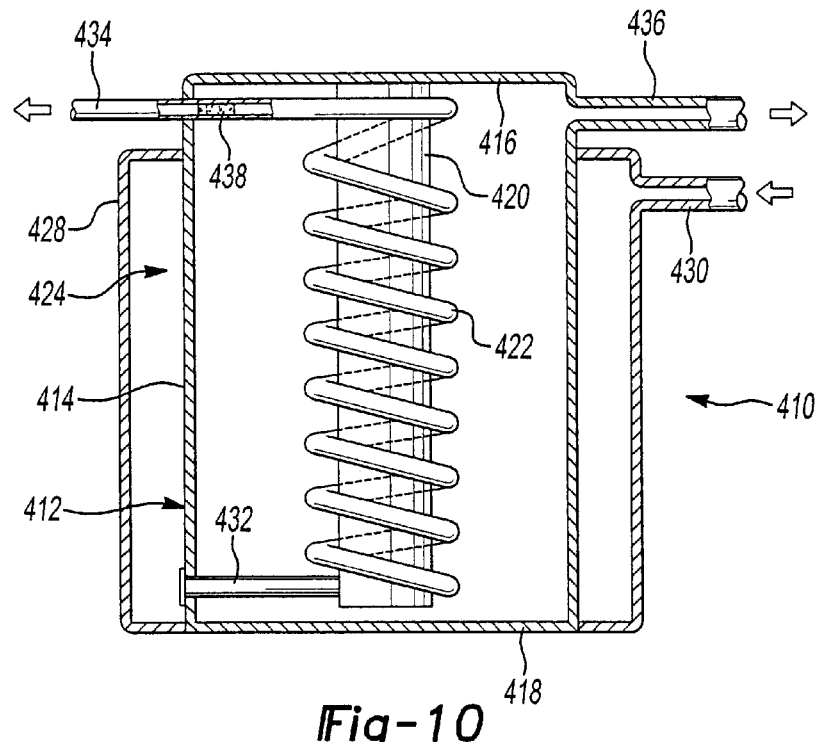
FIG. 10 is a cross-sectional view of a gas purification system constructed in accordance with the present invention.
Figure 11:
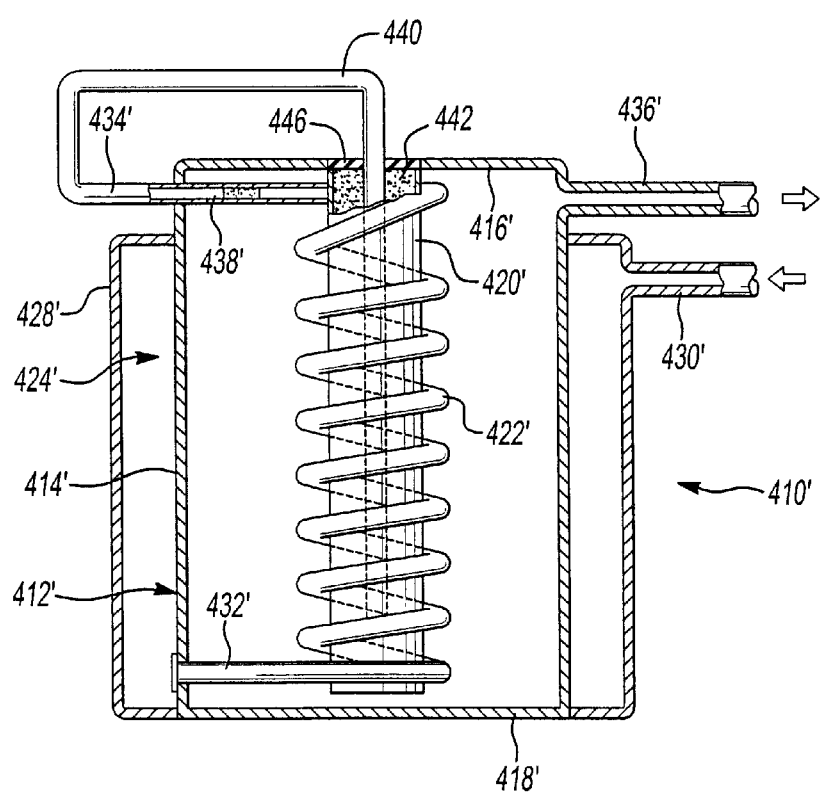
FIG. 11 is a cross-sectional view of a gas purification system further including a conduit for recirculating raffinate air into the heating chamber of the system.

An apparatus for extracting a gas, preferably hydrogen, from a mixed gas flow containing a constituent gas to be separated is generally shown at 410 in FIG. 10. FIG. 11 shows a variant of the invention wherein like parts are shown by primed like numbers. Extraction of a constituent gas from a mixed gas flow using the instant invention is typically facilitated by elevated temperatures. Temperatures in the range of between about 70° C. and 700° C. are useful in promoting increased diffusion rates and catalyst activity. With the use of elevated temperature systems, heat management becomes an important factor in the efficient operation of the gas purification system of the instant invention.

The operation of an apparatus of the instant invention at an elevated temperature poses minimal safety hazards under start-up or shut-down conditions owing to operation of a flow restricting means to lessen the seepage of atmospheric air into the apparatus. Without the innovation of the instant invention, during start-up, the presence of air in contact with gases, such as hydrogen at increasing temperatures as the apparatus reaches steady state operating temperature and pressure is an explosion hazard. A similar hazard exists upon shut-down. In the instant invention, a flow restricting means restricts the back flow of external gas, such as atmospheric air, from entering the apparatus and only allows the unidirectional movement of gas out of the apparatus. The flow restricting means illustratively includes a frit, a plenum or check valve. Preferably, a frit or check valve is adapted as a flow restricting means. With the frit or check valve closing in response to a pressure within the apparatus decreasing below a preselected threshold.

Generally, a gas purification system 410 of the present invention includes a housing shown generally at 412, the housing having a substantially annular side wall 414 and top and bottom walls 416 and 418, respectively. The shape of the housing 412 is not critical with regard to the various aspects of the present invention.

The housing 412 includes a gas heating means in the form of a heating chamber 420 which is shown in FIG. 10. Heating means are well known in the art and illustratively include electrical heating, such as an electrical cartridge heater or a combustion source which are readily disposed within the chamber 420 to heat a mixed gas flow within the housing 412. Alternatively, a furnace or heating tape is provided surrounding the apparatus 410.

Preferably, the housing is 1.0 to 4 inches in diameter. The heating chamber 420 is approximately 0.25 to 3.0 inch in diameter. It is appreciated that these dimensions and the ratio therebetween are readily modified to accommodate different throughput requirements and heat management efficiencies of scale.

The assembly 410 includes a gas extraction means for making an extraction from the mixed gas flow. The system employs a single coiled membrane 422 or 422', multiple coiled membranes, 422", or multiple straight membranes 422''' or 422''''. Representative membrane designs of the instant invention are shown in FIGS. 10 through 14. For hydrogen extraction, the membranes of the instant invention preferably consist of a hydrogen extractable material selected from: palladium-coated refractory metals, or alloys of refractory metals, polymers, palladium-silver, palladium-copper, porous metals, silica, and ceramics. The tubes generally have a diameter of 0.020 to 0.25 inches.

An insulating gas annulus 424 surrounds the housing 412 in order to insulate the housing 412. This is accomplished by the annulus 424 circulating the mixed gas flow about the housing 412 and then injecting the mixed gas flow into the housing 412 for extraction by the gas extraction membrane 422. More specifically, the annulus 424 is in the form of a jacket about the wall 414 of the housing 412. Preferably, the annulus forms a hollow cavity 0.03 to 0.2 inches in thickness, about the housing outside wall 414 and the inner surface of the outside wall 428. The annulus 424 includes an inlet 430 for the entry of the mixed gas flow there into and a communicating portal 432, the mixed gas flow exiting the portal is contacted with the extraction membrane 422. A passageway 436 is provided for removal of the extracted constituent gas.

Preferably, the mixed gas flow inlet 430 and portal 432, into and out of the annulus 424, respectively, are on opposite sides and opposite ends of the housing 412. In this manner, mixed gas flow entering through the inlet 430 flows circuitously about, around and effectively jackets the housing wall 414 prior to exiting from the annulus through the portal 432 and contacting an extraction tube 422. In this manner, the housing wall 414 is simultaneously insulated by the jacketing gas within the annulus 424 while the mixed gas flow within the annulus 424 is preheated prior to entering the extraction membrane 422. Thus, the flow through the annulus 424 serves to preheat the incoming mixed gas flow with heat that would be lost in the environment and/or would go out with the purified hydrogen via the passageway 436. Thus, configured, annulus 424 serves to preheat the mixed gas flow while conserving energy within the system. A particularly effective form of this annulus is shown is FIG. 14, where the annulus 424'''' is extended and set opposite a second annulus 450 in which flows the exiting purified constituent gas. These two annuli serve as a form of curved "flat-plate" heat exchanger, greatly improving the thermal behavior of the system.

The assembly 410 optionally includes a flow restricting means for controlling raffinate mixed gas flow out of the housing 412. The flow restricting means is preferably in the form of a flow restricting frit or check valve disposed proximate to or within the outlet channel 434 of the gas extracting membrane 422. An example of such a flow restricting frit is a porous metal flow restrictor (Mott Metallurgical Corporation, Connecticut, USA). The flow restrictor 438 provides a measure of internal raffinate flow control, improving safety, making small units simpler to build and larger units easier to operate. Optionally, a flow restrictor is adopted to fit within the passageway 436 to prevent backflow into the housing 412.

One of these safety features is serving as a flame arrester so that a fire in the raffinate cannot burn back into the purifier membrane 422 and also so that fire in the purifier membrane 422 cannot shoot out of the gas discharge outlet 434. A second safety feature, operative in the case of a hot start up or sudden shut down, the flow restrictor 438 prevents the sudden contact of explosive mixture with a hot extraction membrane 422. It is appreciated in those aspects of the instant invention having multiple gas extraction membranes contained within a single housing that an added measure of control and therefore safety is attained by butting each such membrane with a separate frit or check valve to each membrane or butting each separate membrane to an exhaust tube that contains a frit or valve therein. Such an exhaust tube entering an outlet channel by way of a manifold or each such exhaust tube leading to the exterior of the apparatus housing.

A system 410', in FIG. 11, is shown to include fluid conducting means in the form of conduit 440 for conducting raffinate mixed gas flow from the gas extraction membrane 422 to the heating chamber 420'. The heating chamber 420' contains a catalyst, shown schematically at 442, which promotes an exothermic reaction (e.g., burning) of the raffmate mixed gas flow to generate heat within the heating chamber 420'.

With specific regard to the mixed gas flow containing hydrogen, the catalyst 442 can be selected from the group consisting of mixed oxides palladium, platinum, and rhodium. A catalyst from this group combines oxygen from the air with hydrogen and other combustible gases in the raffinate flow to generate heat. Further, the housing 412' includes a vent 446 or feed tube 447 (FIG. 14) in fluid communication between the heating chamber 420' and an exterior of the housing 412' for allowing fluid flow of air into the heating chamber 420' for reacting with the raffmate bleed on the catalyst 442 to generate heat within the heating chamber 420'. Heat is generated within the heating chamber 420' when it is filled with the appropriate catalyst 442 and is presented with the raffinate bleed via the conduit 440 and the outlet channel 434', the raffinate containing hydrogen plus impurities, and with air that counter defuses in through the top vent 446 or which enters under pressure through the feed tube 447. Thus, the heating chamber 420' is heated with a limited requirement of any external energy being expended possibly for start-up and temperature control.

The vent 446 is in the form of a mesh or a tube which keeps the catalyst 442 in place, and allows reaction products e.g., water and carbon dioxide to leave the heating chamber 420'. Alternatively, a controllable mechanism monitors and controls the amount of oxygen entering the heating chamber 420'. Such an active control vent is regulated by a thermal, pressure or like feed back mechanism.

The above described heating method is most appropriate for use with 60% to 90% hydrogen mixed gas flow sources. Examples of such sources are petrochemical fuel-gas streams, and the products of methanol, ethanol, or petroleum-water reforming. A flow restrictor 438 is preferred in combination with the system of the instant invention. Without such a restrictor 438, careful control of the raffinate flow is required, else a flame may shoot out of the catalytic combustor (the heating chamber 420'). Further, a restrictor can prevent very hot air from being drawn back into the device when the flow is turned off. This drawn back air may lead to an explosion. Hence, the addition of the restrictor 438 in combination with the recycling raffinate/catalyst heating mechanism of the instant invention provides a safe and efficient heating system.

In the invention as shown in FIG. 10, a mixed gas flow enters the annulus 424 through the inlet 430 and effectively jackets the housing wall 414 thereby insulating the housing 412. Simultaneously, the mixed gas flow within the annulus 424 is preheated prior to entering the core of the gas extraction membrane 422. The mixed gas flow enters the gas extraction membrane portal 432 and hydrogen gas is extracted from the mixed gas flow and exits through passageway 436. The raffinate mixed gas flow exits the extraction tube 422 through outlet channel 434, the flow of which is controlled by the restrictor 438. As shown in FIG. 11, the mixed gas flow circulates through the conduit 440 into the heating chamber 420' so as to react with ambient air entering through the passageway 446 so as to react on the catalyst 442 to generate heat.

Thus, the present invention further provides a method for purifying gas at high temperatures by heating the mixed gas flow within the housing 412 and making an extraction from the gas. The method further includes the steps of insulating the housing 412 by circulating the mixed gas flow about the housing 412 and injecting the mixed gas flow into the housing. By injecting, it is meant that the pressure head of the mixed gas flow entering the annulus 428 forces the mixed gas flow through the portal 432 into the extraction membranes 422.

The instant invention optionally further includes the steps of conducting the raffinate mixed gas flow from the housing 412 to the heating chamber 420' and reacting the mixed gas flow on the catalyst 442 within the heating chamber 420' to generate heat within the heating chamber 420'.

Figure 14:
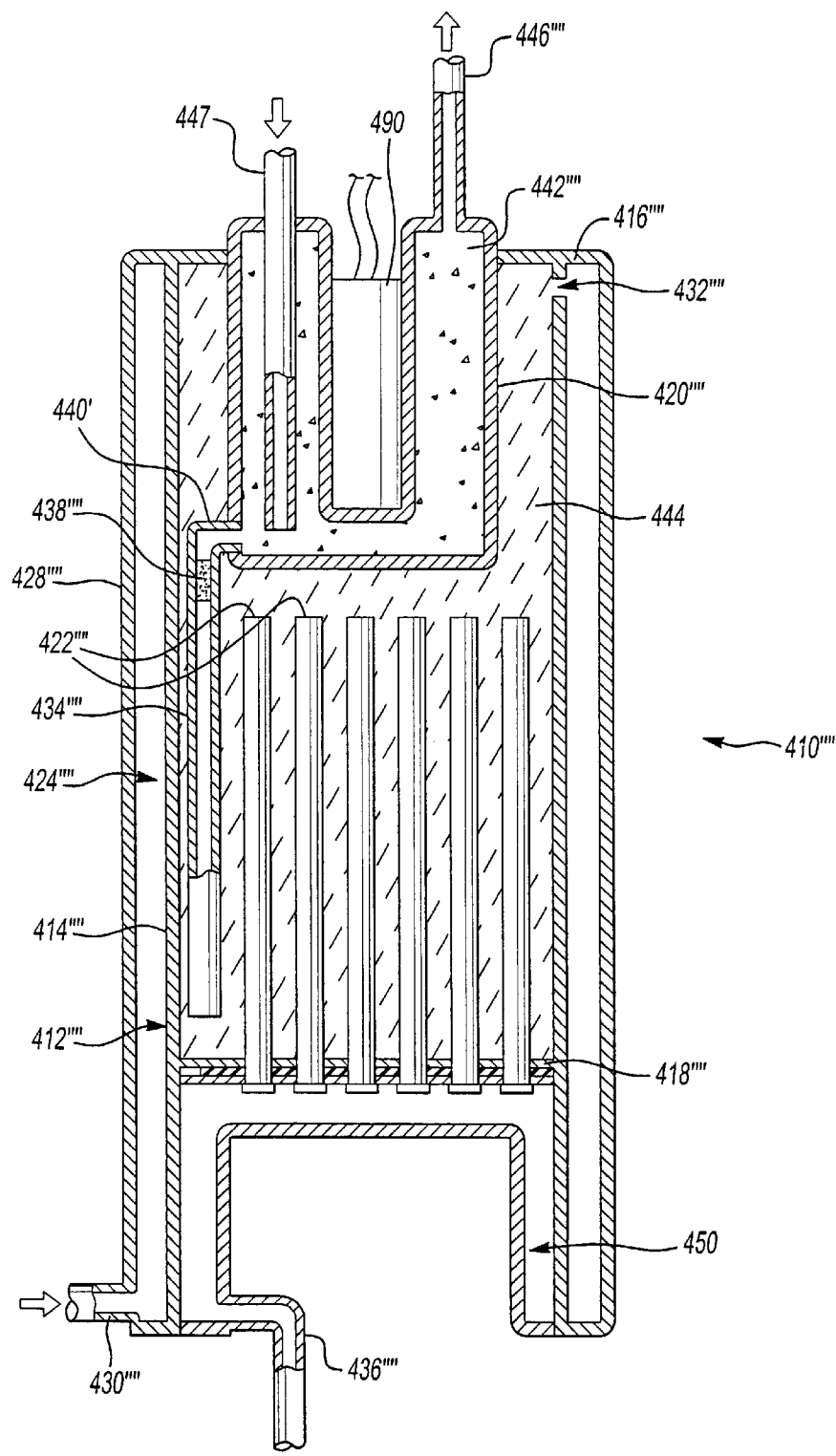
FIG. 14 is a cross-sectional view of a fifth embodiment of the present invention suited for generating hydrogen from methanol and water.

This step involves the entrance of raffinate via conduit 440, the entrance of a second reactant, e.g., air by vent 446 (FIG. 11) or an inlet tube into the heating chamber 420' for reacting on the catalyst 442 to generate heat into the heating chamber and the venting of products via 446. An electric heater 400 is optionally provided for start up of the system of the instant invention (FIG. 14).

The annulus 424 of the present invention is a more effective insulating layer than a stagnate gas because the continuous flow provides feed heating that would otherwise have to be provided by some other heating source. In the end, this improves temperature uniformity and reduces the heat loss to the environment. For a proper choice of annulus size, the annulus combined with a thermal insulating blanket is more effective at conserving heat than a thermal blanket alone. The flow through this layer preheats the incoming gas with heat that would be lost in the environment and/or would be carried away with pure hydrogen.

Figure 12:
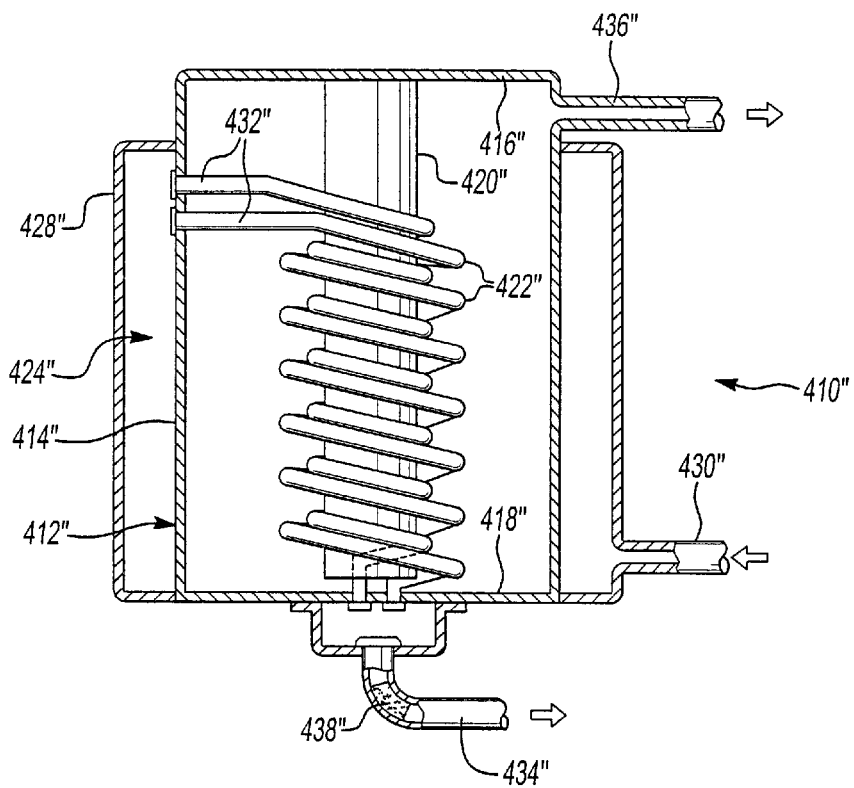
FIG. 12 is a cross-sectional view of a third embodiment of a gas purification system constructed in accordance with the present invention.

FIG. 12 shows two spiral tubes 422" functionally in combination. Again, double primed numerals are used to indicate like structure between the several illustrative figures. FIG. 12 illustrates the use of multiple tubes, the number of the tubes depending upon factors including the interior space of the housing 412". The increase in tube number increases throughput. Thusly, a predetermined size housing 412" can include multiple gas extraction membranes and thereby increase productivity and effectively decrease costs. It is further appreciated that each of multiple tube arrangement is optionally configured with an individual flow restrictor for each tube (not shown).

Figure 13:
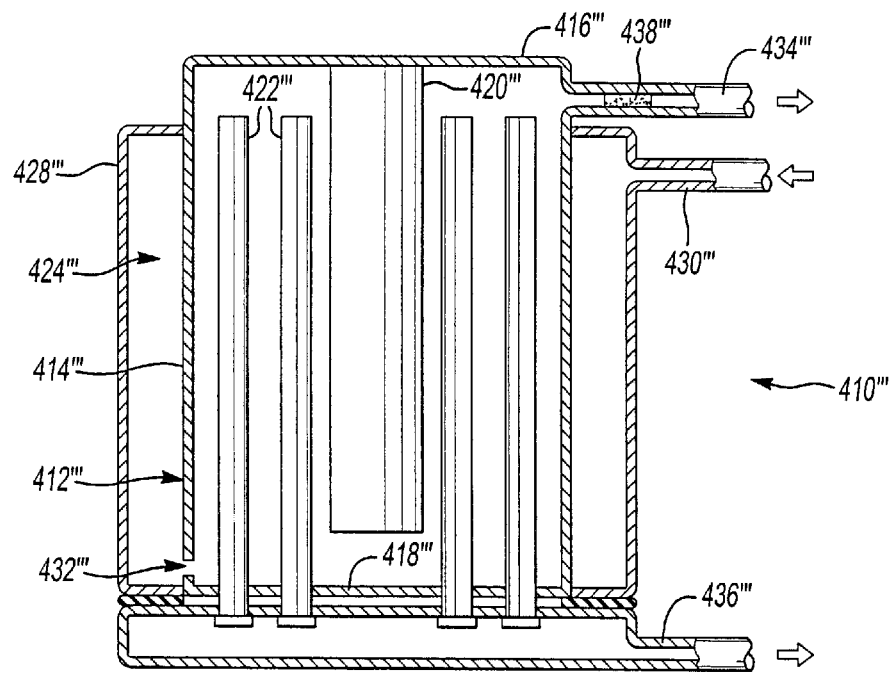
FIG. 13 is a cross-sectional view of a fourth embodiment of the present invention which includes flat sheet membranes.

In FIG. 13 like structures between the several embodiments are shown as triple primed numerals. In FIG. 13, the present invention is shown to include an annulus 424''', and a flow restrictor 438''' in combination with multiple straight gas extraction tubes 422'''. Such an embodiment has numerous applications for the extraction of constituent gases other than hydrogen. Certain ceramic membranes cannot be coiled but are nonetheless operative as extraction membranes in the present invention. Hence, the flexibility of the present invention is demonstrated in the application of gas extraction membranes other than spiral metal membranes. Likewise, the embodiment of the present invention of FIG. 13 is operative with the fluid conducting means discussed above for conducting raffinate mixed gas flow from the gas extraction tubes to the heating chamber of reaction catalysts to generate heat within the heating chamber.

The elevated temperature of operation and the pressure gradients associated with gas membrane extraction may induce deformation of the membrane 422". In embodiments of the instant invention, such as that depicted in FIG. 13, where a mixed gas flow is simultaneously in contact with the interior of the housing 412 and a membrane 422", there is a likelihood of membrane collapse, owing to the mixed gas flow pressure exerted on a membrane. To prevent such deformation a coiled support is optionally inserted within a membrane (not shown). The coil support preferably has a pitch of less than about 30°, larger pitch angles do not provide adequate stiffening properties. More preferably, the pitch angle is between 3° and 25°. The coiled support is constructed of a material having a higher rigidity and tensile strength than the membrane in operation. Furthermore, the support is not reactive towards a constituent gas, under operation temperatures of the instant invention. For extraction of constituent gases other than hydrogen, membrane materials specific to the constituent gas are selected from these known to the art, either alone, or coated to increase gas extraction efficiency.

In FIG. 14, the present invention is shown with an annulus 424'''' that is extended to enhance recovery from the extracted constituent gas as it flows through a second annulus 450. In FIG. 14, four primed numerals indicate like structure between the several figures. Further, included is a reforming catalyst, 444. The reforming catalyst allows the module to accept organic feeds directly. For example, a mixed flow of methanol and water or of ethanol and water illustratively serves as feedstock. The mixture is heated in the annulus, vaporized, and contacts the catalyst, 444, thereby generating hydrogen. The hydrogen is then purified through the membranes 422'''' and collected at 436''''. The raffinate is then combusted at 420''''. Preferably, the raffinate is combusted on the combustion catalyst 442'''', providing the heat to maintain the reaction. An electric heater 490 is provided to further regulate reactor temperature. In FIG. 14, a membrane reactor 410'''' is built with flow restrictor 438'''' and annulus 424'''' for generating hydrogen, preferably from an alcohol and water mixture or from a gasoline and steam mixture. A methanol (or other) reforming catalyst 444 is disposed within the housing 412'''' and adjacent to the extraction tubes 422''''. Hydrogen is formed e.g., by the reaction $MeOH+H_2O \rightarrow 3H_2+CO$. Much of the hydrogen is collected at the annulus 450, where it is cooled and fed to the exit passageway 436'''', the remainder is vented to combustion within the heating chamber 420'''' along with non-reacted components $CO$, $CO_2$, alcohol and $H_2O$. Hence, this system includes two different catalysts. A first catalyst is the methanol reforming catalyst 444 for generating hydrogen from methanol and water. Ideally, this first catalyst also operates as a water-gas shifter catalyzing the reaction $CO+H_2O \rightarrow CO_2+H_2$. A second catalyst is contained within the heating chamber 420'''', as discussed in detail above, for generating heat within the chamber.

The packing described previously can be catalytic (e.g. catalyst pellets or Pt mesh). This embodiment of the present invention can be used when removing hydrogen from mixtures of alkanes and alkenes, or for the reforming of methanol water mixtures. Adding a catalytic packing makes these modules into membrane reactors and so favors alkene and hydrogen production. For example, this process can be used in the production of butene from butane; an initial butene-forming reactor could be followed by a membrane reactor made according to the present design. Butene production would be enhanced, and the hydrogen gas would be extracted through the membranes for use elsewhere.

These modules can also be used as a hydrogen extractor for the removal of radioactive hydrogen isotopes from nuclear reactor streams. For this use, it may be advisable to employ a membrane that is coated with palladium on only a single side. This is because many important nuclear reactor streams (e.g., liquid metals) are reactive to palladium.

The module designs listed above could also be beneficial for purification of other gases (e.g. helium or arsine) if the appropriate membrane is used. Thus, for example, an array of small-diameter silica membranes could be packaged in a catheter-inside module as shown in FIG. 2B for use in helium purification.

As a hydrogen extractor, the present invention can be used for ultra-purifying cylinder or electrolysis derived hydrogen for use, for example, in electronics manufacture or gas chromatography. Also as a hydrogen extractor it can be used for removing hydrogen from mixtures of alkanes and alkenes, so as to favor alkene production. For example, this process can be used in the production of butene from butane; hydrogen gas would be extracted at intermediate stages in a furnace-reactor-furnace-reactor etc. train, the hydrogen being available for use elsewhere.

In a similar respect, the membrane can take advantage of the differences in diffusivities and permeabilities of the various hydrogen isotopes, especially at low temperature. Thus, as a hydrogen extractor, the membranes of the present invention can be used to separate different hydrogen isotopes from others as well as from non-hydrogen components.

As a membrane reactor, the present invention can be used for removing hydrogen during the production of alkenes from alkanes. For example, the present invention can be used for making butene from butane by shifting the equilibrium within the reaction chamber. This case would be like the reactor furnace extractor train mentioned previously, but condensed into a single process membrane reactor. The endothermicity of the reaction can be aided by adding a diluent, e.g. steam, to the hydrogen extractrate side of the membrane or by the addition of oxygen on the side. The hydrogen that is burned in this way is lost for other uses thereby, but the alkene formation reaction (generally an endothermic reaction) would be heated in situ by the hydrogen oxidation and accordingly, hydrogen pumping, membrane reactor, and furnace costs would be minimized.

According to the present invention, a single chamber continuously cooled membrane reactor operates with improved efficiency relative to a conventional pressure swing absorption system including two water-gas shift reactors having an intercooler interspersed therebetween. An embodiment of a pressure swing absorption system according to the present invention is detailed with respect to FIG. 15. A cooled membrane reactor is shown generally at 500. A mixed gas stream containing hydrogen is in fluid communication with the reactor 500. An intercooler 510 optionally receives the mixed gas stream containing hydrogen from a conventional high temperature reformer. The intercooler 510 reduces the mixed gas flow temperature prior to entering a central chamber 512 of the reactor by way of an inlet 514. In a preferred embodiment, a hydrogen selective membrane 516 is aligned in a generally vertical orientation in order to improve gas distribution as compared to prior art horizontal membranes. More preferably, a plurality of membranes 516 are disposed within the central chamber 512.

The intercooler 510 is necessitated by a mixed gas stream containing hydrogen entering the present invention upon exiting a high temperature reformer. The intercooler 510 is intended to cool the mixed gas stream. Preferably, the mixed gas stream has a temperature between 450° C. and 130° C. upon entering inlet 514.

The mixed gas stream upon entering the central chamber 512 contacts a water-gas shift catalyst 513 and the hydrogen selective membrane 516. The water-gas shift catalyst 513 converts carbon monoxide and water in the mixed gas stream to carbon dioxide and hydrogen without forming appreciable quantities of methane or other undesirable byproducts. Preferably, the catalyst is pelletized. Regardless of the catalyst form, it is preferred that the catalyst remain in physical contact with the membrane. Conventional catalysts operative in the water-gas shift process illustratively include iron-chromium, copper-zinc, cobalt-molybdenum, their oxides and combinations thereof alone or in the presence of ceramic substrates, with or without nonalkali metal promoters, as detailed in U.S. Pat. No. 5,229,347. Deleterious heat generated by the water-gas shift reaction to form carbon dioxide and hydrogen is removed from the central chamber 512 by way of a jacketing annulus 518. The jacketing annulus 518 having a coolant inlet 520 and an outlet 522 for removing coolant heated through interaction with the central chamber 512. Preferably, the coolant inlet 520 and outlet 522 are displaced to opposite sides and opposite ends of the membrane reactor 500. In this manner, coolant entering through the inlet 520 flows circuitously about and around and effectively jackets the central chamber walls prior to exiting from the annulus 518 through the outlet 522. It is appreciated that the coolant is optionally within a recycle loop between annulus inlet 520 and outlet 522. Alternatively, the coolant outlet is in fluid communication with a burner. A burner is either of the open-flame or catalytic type and is optionally used to maintain a high temperature reformer in a thermally stable condition. The coolant operative in the present invention includes any liquid or gas nonreactive towards the materials defining annulus and central chamber walls. Ambient air and water-glycol mixtures are the preferred coolants according to the present invention.

Figure 15:
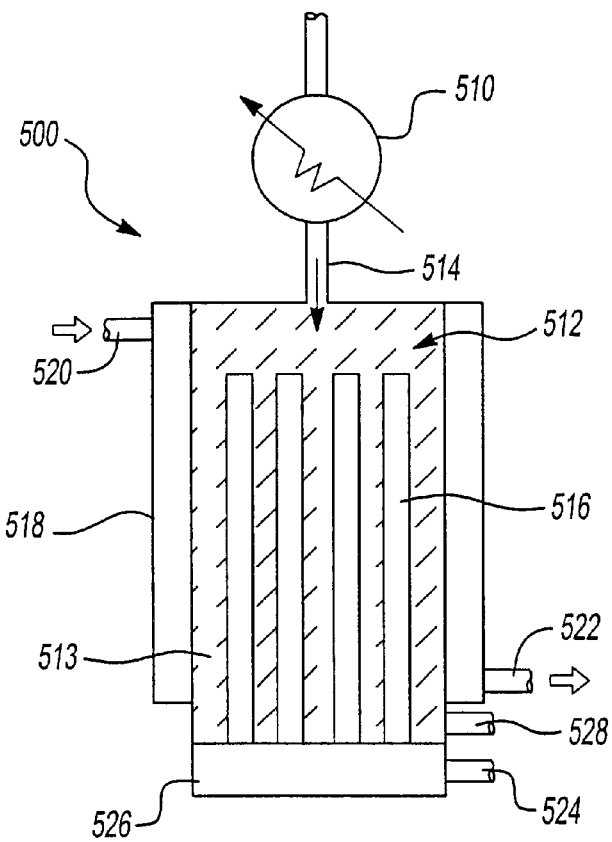
FIG. 15 is a cross-sectional view of a cooled membrane reactor according to the present invention.

Hydrogen produced by the gas shift reaction within the central chamber 512 or entering the reactor 500 as part of a mixed gas flow is extracted through the membrane 516. A purified hydrogen outlet 524 is in fluid communication with the purification side of membrane 516. In those embodiments of the present invention having multiple membranes, it is appreciated that a manifold 526 intermediate between the outlet 524 and the membrane 516 facilitates hydrogen removal from the reactor 500. An advantage of the present invention is that selective hydrogen extraction from the gas mixture within the central chamber 512 drives the water-gas shift reaction equilibrium towards further production of carbon dioxide and hydrogen than would otherwise be possible under a given temperature and pressure. Selective hydrogen extraction through the membrane 516 further serves to increase the contact time between the mixed gas stream and the water shift catalyst 513. The increased gas-catalyst contact time facilitates the design of a compact membrane reactor containing correspondingly lesser amounts of costly water-gas shift catalyst materials. Purified hydrogen exiting outlet 524 has a purity of 85% or greater based upon the quality of membrane 516 and the integrity of reactor seals. In a preferred embodiment the exiting hydrogen leaves with a purity in excess of 99.999%. Raffinate from the central chamber 512 containing waste gases such as $CO_2$, $H_2O$ and CO is vented through outlet 528. In a preferred embodiment this raffinate is burnt to provide heat to the high temperature reformer supplying mixed gas to the reactor 500. As a result of the hydrogen purity exiting outlet 524, subsequent purified hydrogen treatment required is often lessened, and may not be needed at all. It is appreciated that the PSA unit detailed with respect to FIG. 15 is readily replaced by a methanation unit or small partial oxidation reactor.

Figure 16:
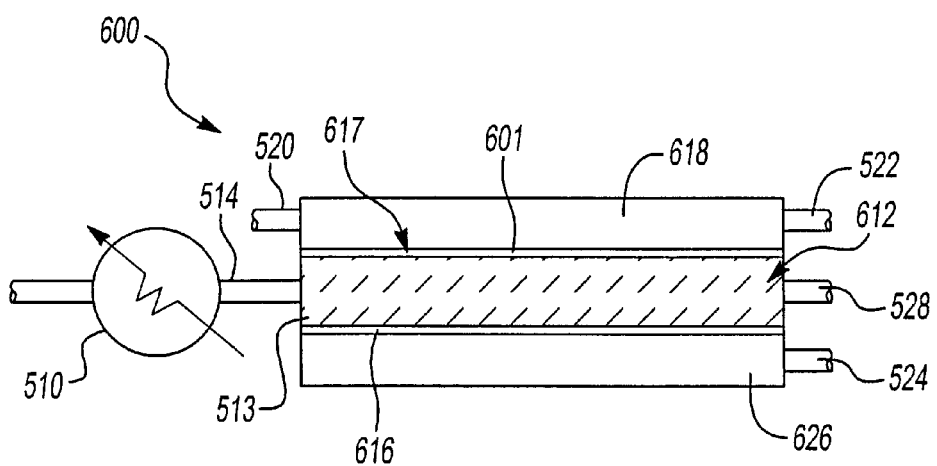
FIG. 16 is a cross-sectional view of an embodiment of a cooled membrane reactor according to the present invention.

Another embodiment of a cooled membrane reactor according to the present invention is shown generally at 600 in FIG. 16. The membrane reactor 600 represents a flat plate geometry having a flat plate heat transfer surface 601. It is appreciated that the flat plate surface 601 is modified to inhibit laminar flow. Typical modifications to flat plate surface 601 illustratively include bumps, corrugations and the insertion of a gas permeable fibrous wire or wool (not shown). A central chamber 612 contains a water-gas shift catalyst 513 as described with respect to FIG. 15. The central chamber 612 is bounded by a hydrogen selective membrane 616 and a wall 617 having flat plate surface 601 as a portion thereof. The membrane 616 being composed of materials as detailed with respect to FIG. 15. The cooled membrane reactor 600 has an inlet 514 for a mixed gas stream and an outlet 528 carrying waste gas raffinate from the reactor 600. A coolant flow chamber 618 has an inlet 520 and an outlet 522 for the passage of coolant therethrough.

The mixed gas stream entering through inlet 514 optionally passes through an intercooler 510 prior to entering the central chamber 612.

The membrane surface opposite the central chamber 612 defines a portion of a purified hydrogen collector head 626. The purified hydrogen collector head 626 has an outlet 524 for the removal of hydrogen therefrom.

Like numbered components in FIG. 16 relative to FIG. 15 rely on the description of those components provided with respect to FIG. 15.

It is appreciated that heated air coolant optionally utilized in the present invention is also optionally fed to a burner heating a high temperature reformer supplying a mixed gas stream to the present invention. The use of preheated combustion air thereby improving burner efficiency. Similarly, it is appreciated that the waste gas exiting a cooled membrane reactor according to the present invention is also readily fed into a burner where waste gas components are combusted to provide heat to the high temperature reformer and thereby improving overall system efficiency and lessening operational waste streams.

In contrast to prior art membrane reactors, the present invention operates in a cooling mode. Operating a membrane reactor in a cooling mode according to the present invention affords improved membrane reactor lifetime. Additionally, several high selectivity membrane materials that are ill suited for operation at the temperatures found in high temperature steam reformers, are operative in the cooled membrane reactors according to the present invention. Palladium-copper and palladium-silver are illustrative hydrogen separation membranes ill suited for high temperature operation yet are operative herein. Regardless of the membrane composition, it is preferred that membranes are supported to extend operative lifetime with structures conventional to the art illustratively including porous backing, screen, mesh, or internal springs.

While the present invention is detailed with respect to a water-gas shift reactor, it is appreciated that other reactions are readily carried out in a cooled membrane reactor according to the present invention.

Also as a membrane reactor, the present invention can be used for low temperature hydrogen generation from partial combinations of gasoline or from alcohol reforming reactions. It can also be used to enhance the specificity of hydrogenation reaction where hydrogen is extracted from a fluid stream and used to hydrogenate a product. Hydrogenation of a stream containing butadiene and butyne has some commercial potential. The butyne would be preferentially hydrogenated allowing it to be economically extracted as butene and recycled. There are also applications in vitamin and perfume manufacture.

Figure 3B:
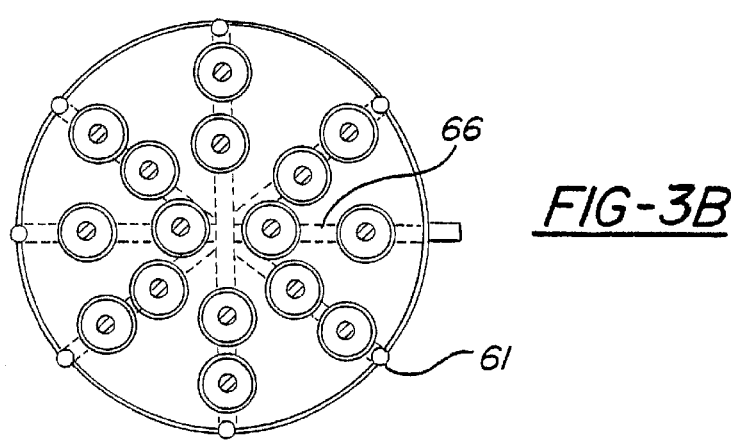

The following examples illustrate the utility of the present invention for removing hydrogen from a fluid mixture containing hydrogen whereas coated membranes as shown in FIGS. 3 and 4 are used.

Materials and Methods for Experiment

Sections of Pd-25% Ag tube (3/32"× of 0.0015" wall) were cut. The tubes were coated with palladium grey as per standard electroless procedure.

The sections were assembled in apparatus with a Swagelok cap (available from Cajon Co., Macedonia, Ohio) on one end providing a seal. A Swagelok reducing union with a graphite ferule was applied on the other end. In later experiments, the Swagelok cap was replaced by a brazed metal cap.

Several volumes of nitrogen were applied at room temperature until most of the air was flushed out. The assembly was then heated to desired temperature approximately 400° C. and $H_2$ was applied to the apparatus. The pressure upstream and downstream of the membrane was measured. The flow of $H_2$ gas through the membrane and the outflow of the purge stream were also measured. The various parameters were calculated.

The membrane was composed of Pd-25% Ag coated with palladium. The surface had a composition of:

|  | After Run | Before Run |
| --- | --- | --- |
| Inside surface | Pd: 97.83 | 99.08 |
|  | Ag: 2.17 | 0.92 |
| Outside | Pd: 97.73 | 93.83 |
|  | Ag: 2.27 | 6.17 |

From the above it appears that in operation palladium is transferred from the inner to the outer surface of a palladium-silver membrane. Thus, one advantage of palladium coating a palladium-silver membrane is that it forestalls palladium depletion on the inner (low hydrogen pressure) side of the membrane. This extends the useful membrane life.

Figure 6:
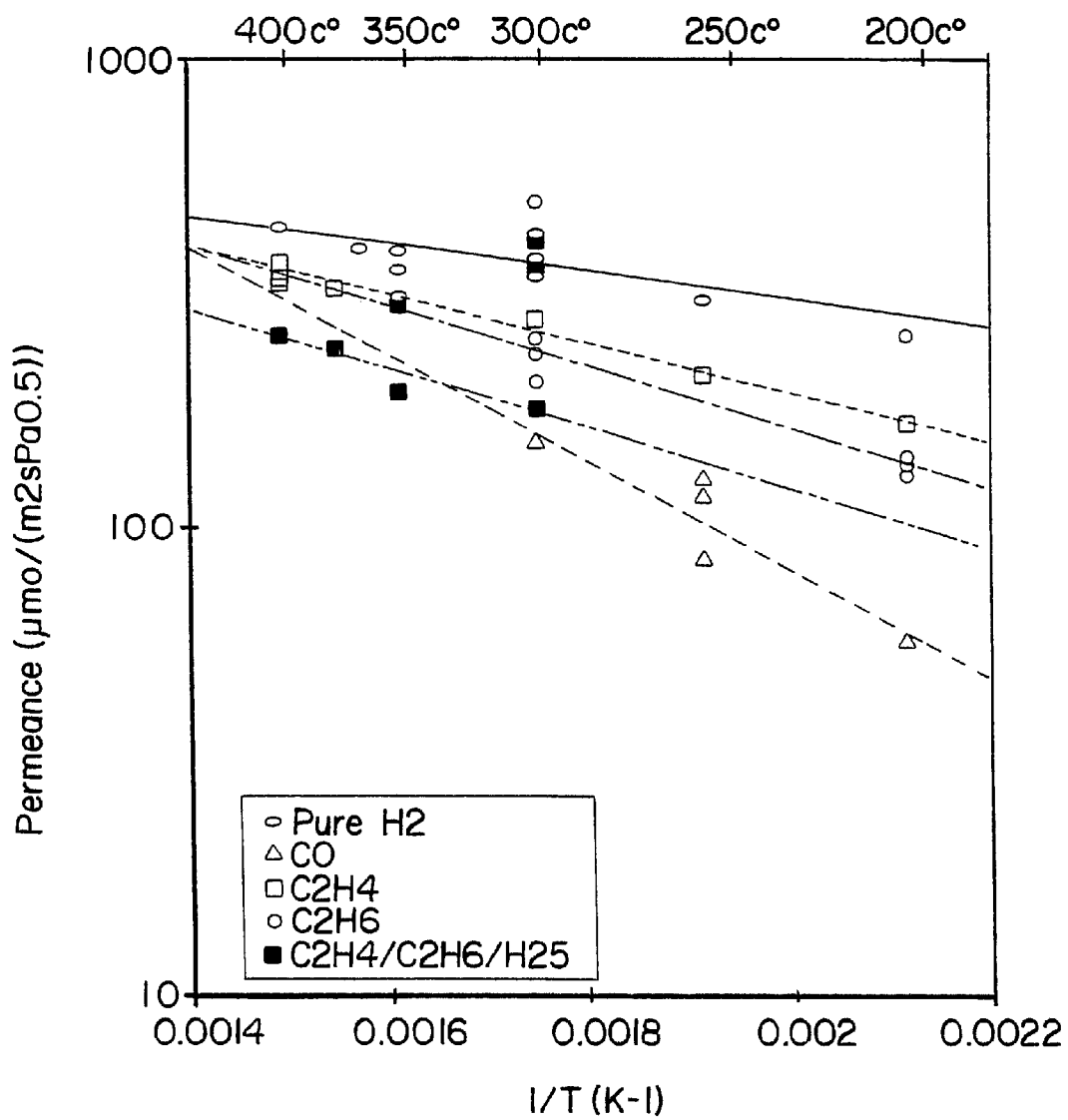
FIG. 6 is a graph comparing the permeation of hydrogen to that of mixed gases using membranes of the present invention.
Figure 7:
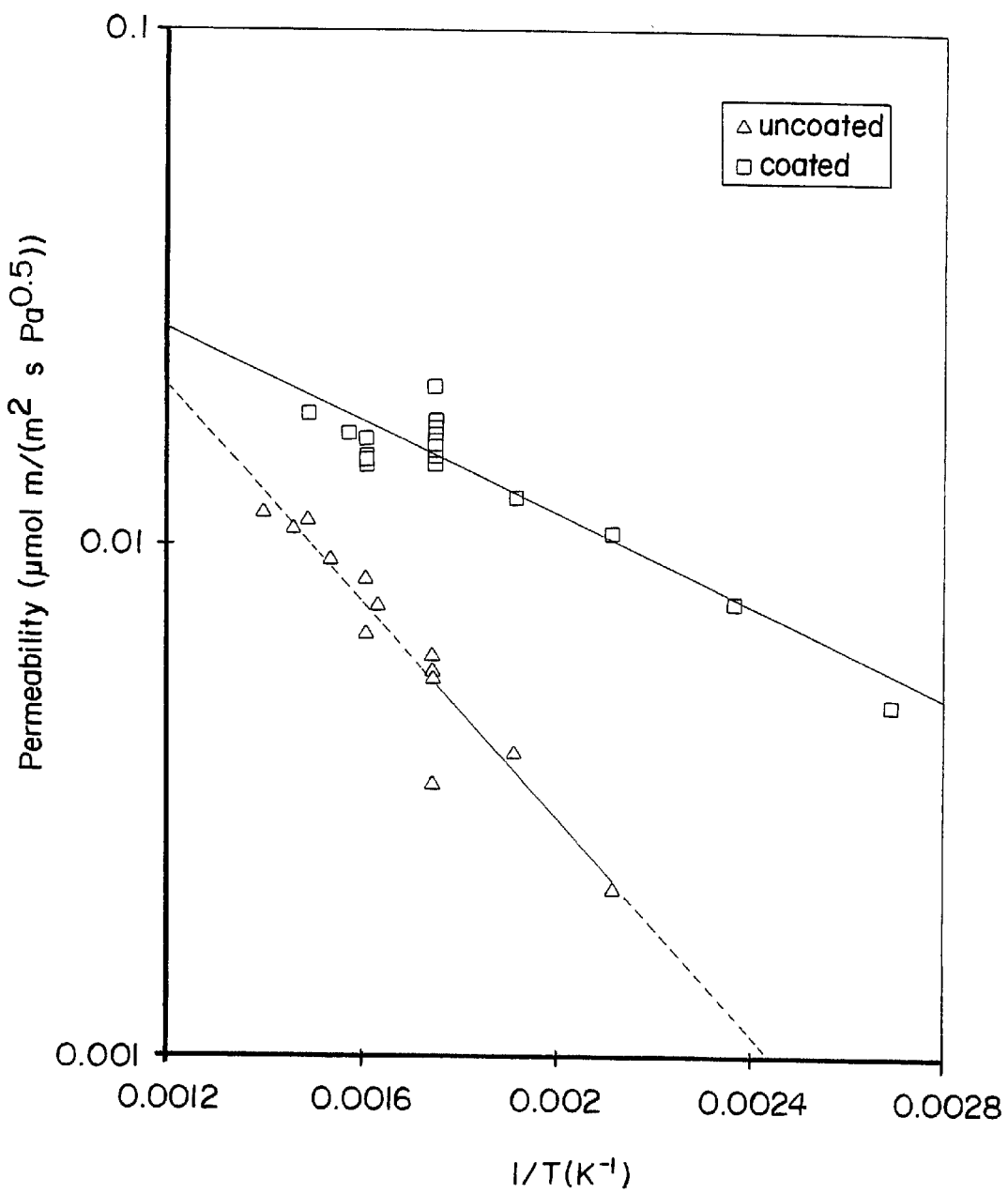
FIG. 7 is a graph showing the permeability of hydrogen through a membrane of the present invention as compared to an uncoated membrane.

As a control, an uncoated Pd-25% Ag tube was run as per the same procedure and the results comparing the two membranes are shown in FIG. 6. Compared to the uncoated membrane, the coated membrane was far superior at low temperature operation where, apparently, the palladium catalyzes the $H_2$ association/dissociation far better than palladium-silver. Also, the coated membrane was better at resisting poisoning from hydrogen sulfide and ethylene.

The invention has been described in an illustrative manner, and it is to be understood the terminology used is intended to be in the nature of description rather than of limitation. Unless stated otherwise, compositional percentages are weight percent based on total weight.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

All patents and other publications cited are incorporated herein by reference.

What is claimed is:

1. A process for separating a gas component from a mixed gas stream comprising the steps of:

reacting a mixed gas stream exothermically with a catalyst in the presence of a membrane selective for passing the gas component; and flowing coolant in thermal communication with the mixed gas stream.

2. The process of claim 1 wherein said membrane has a pressure differential thereacross of between 1 and 500 psia and a mixed gas stream pressure of between 1 and 1000 psia.

3. The process of claim 1 wherein reaction occurs at a steady state temperature of between 5° C. and 650° C.

4. The process of claim 1 wherein the mixed gas stream comprises carbon monoxide and water vapor.

5. The process of claim 1 wherein said catalyst is a water-gas shift catalyst.

6. The process of claim 5 wherein said catalyst is pelletized.

7. The process of claim 5 wherein said catalyst is in physical contact with said membrane.

8. A method of operating a water-gas shift membrane reactor comprising flowing a coolant in thermal communication with said reactor to withdraw heat generated by a water-gas shift reaction.

9. The method of claim 8 further comprising driving said reaction by selectively removing a reaction product of said reaction.

10. The method of claim 9 wherein the reaction product is hydrogen gas.

11. A membrane reactor comprising:

a chamber;

an inlet for introducing a mixed gas stream into said chamber;

a gas separator membrane having a surface in fluid communication with the mixed gas stream and an opposing surface in contact with a constituent gas of the mixed gas stream that has passed through said membrane, said membrane disposed within the dimensions of said chamber;

a catalyst disposed within said chamber that facilitates an exothermic chemical reaction of the mixed gas stream;

a flowing coolant in thermal contact with said chamber withdrawing thermal energy from said chamber;

a first outlet in fluid communication with the opposing surface of said membrane for removing said constituent gas that has passed through said membrane; and a second outlet for removing a waste gas stream from said chamber.

12. The membrane reactor of claim 11 further comprising an intercooler in fluid communication with said inlet for precooling the mixed gas stream prior to entering said chamber.

13. The membrane reactor of claim 12 wherein said intercooler reduces the mixed gas stream to an exiting temperature of between 450° C. and 130° C.

14. The membrane reactor of claim 11 wherein said membrane defines a wall of said chamber.

15. The membrane reactor of claim 11 wherein the chemical reaction is a water-gas shift reaction.

16. The membrane reactor of claim 11 wherein said catalyst is selected from the group consisting of oxides and sulfides of cobalt, nickel, copper, zinc, molybdenum, tungsten or combinations thereof or of the reduced metals themselves alone or in combination.

17. The membrane reactor of claim 11 wherein said catalyst is pelletized.

18. The membrane reactor of claim 11 wherein said catalyst is in physical contact with said chamber and in thermal contact with said coolant therethrough.

19. The membrane reactor of claim 11 wherein said catalyst is in direct contact with said membrane.

20. The membrane reactor of claim 11 wherein said membrane is of a shape selected from the group consisting of: a cylinder, a plate, and a cylindrical coil.

21. The membrane reactor of claim 11 wherein said membrane comprises a plurality of membranes.

22. The membrane reactor of claim 11 wherein said membrane is a palladium alloy or a palladium-coated base metal.

23. The membrane reactor of claim 22 wherein the palladium alloy is selected from the group consisting of palladium-copper and palladium-silver.

24. The membrane reactor of claim 11 further comprising a structural membrane support bracing said membrane.

25. The membrane reactor of claim 11 wherein said coolant is a gaseous fluid.

26. The membrane reactor of claim 11 wherein said coolant is air.

27. The membrane reactor of claim 11 further comprising a coolant outlet through which said coolant flows from said chamber.

28. The membrane reactor of claim 27 wherein said coolant outlet is in fluid communication with a burner and said coolant is a combustible gaseous fluid.

29. The membrane reactor of claim 28 wherein said burner is of a type selected from the group consisting of: open flame and catalytic.

30. The membrane reactor of claim 11 wherein said coolant flows concurrent with the mixed gas stream.

31. The membrane reactor of claim 11 wherein said outlet for removing the remainder or raffinate stream is in fluid communication with a burner.

32. The membrane reactor of claim 11 wherein said membrane is disposed generally vertically during operation.

33. The membrane reactor of claim 11 further comprising a header in fluid communication with the opposing surface of said membrane and said outlet for removing said constituent gas.

* * * * *

UNITED STATES PATENT AND TRADEMARK OFFICE
CERTIFICATE OF CORRECTION

PATENT NO. : 6,461,408 B2
DATED : October 8, 2002
INVENTOR(S) : Buxbaum

It is certified that error appears in the above-identified patent and that said Letters Patent is hereby corrected as shown below:

Column 2,
Line 28, after "Hill" insert -- '235 patent discloses an --.

Column 6,
Line 5, replace "raffmate" with -- raffinate --.

Column 15,
Lines 37 and 48, replace "raffmate" with -- raffinate --.

Signed and Sealed this

Seventeenth Day of June, 2003

JAMES E. ROGAN
*Director of the United States Patent and Trademark Office*